(12) United States Patent
Nakamura et al.

(10) Patent No.: US 10,864,820 B2
(45) Date of Patent: Dec. 15, 2020

(54) VIRTUAL IMAGE DISPLAY OPTICAL SYSTEM AND IMAGE DISPLAY DEVICE

(71) Applicant: Konica Minolta, Inc., Tokyo (JP)

(72) Inventors: Kentarou Nakamura, Tokyo (JP); Norihide Yamada, Chiyoda-ku (JP); Eiji Nomura, Kokubunji (JP); Junji Hashimura, Hachioji (JP); Shinichiro Saito, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 16/345,939

(22) PCT Filed: Oct. 30, 2017

(86) PCT No.: PCT/JP2017/039207
§ 371 (c)(1),
(2) Date: Apr. 29, 2019

(87) PCT Pub. No.: WO2018/079794
PCT Pub. Date: May 3, 2018

(65) Prior Publication Data
US 2020/0055395 A1    Feb. 20, 2020

(30) Foreign Application Priority Data
Oct. 31, 2016   (JP) ................. 2016-213827

(51) Int. Cl.
*G02B 27/01* (2006.01)
*B60K 35/00* (2006.01)

(52) U.S. Cl.
CPC .......... *B60K 35/00* (2013.01); *G02B 27/0101* (2013.01); *G02B 27/0149* (2013.01);
(Continued)

(58) Field of Classification Search
CPC ............ B60K 35/00; B60K 2370/1529; B60K 2370/334; G02B 27/0149; G02B 27/0101;
(Continued)

(56) References Cited

U.S. PATENT DOCUMENTS

2014/0036374 A1   2/2014   Lescure
2016/0134848 A1*  5/2016   Watanabe .............. B60K 35/00
                                                      345/7
(Continued)

FOREIGN PATENT DOCUMENTS

EP         3015905 A1    5/2016
JP      2009150947 A     7/2009
(Continued)

OTHER PUBLICATIONS

European Search Report dated Aug. 2, 2019 for the corresponding EP Patent Application No. 17863477.0.
(Continued)

*Primary Examiner* — Towfiq Elahi
(74) *Attorney, Agent, or Firm* — Rankin, Hill & Clark LLP

(57) ABSTRACT

An object of the present invention is to provide a virtual image display optical system that is capable of substantially simultaneously displaying virtual images at a plurality of distances even with a simple configuration, and an image display device using the virtual image display optical system. A virtual image display optical system (30) according to the present invention is provided with: a display element (11); a projection optical system (15) that enlarges an image formed on the display element (11); a diffusing screen (16) that has a diffusing function, and is positioned on the light emission side of the projection optical system (15); and a virtual image forming optical system (17) that converts an image on the diffusing screen (16) into a virtual image, wherein the virtual image display optical system (30) is further provided with a positioning changing device (62) that changes a position of the diffusing screen (16).

20 Claims, 15 Drawing Sheets

(52) U.S. Cl.
CPC ............... *B60K 2370/1529* (2019.05); *B60K 2370/334* (2019.05); *G02B 2027/0127* (2013.01); *G02B 2027/0145* (2013.01); *G02B 2027/0154* (2013.01); *G02B 2027/0185* (2013.01)

(58) Field of Classification Search
CPC .... G02B 2027/0145; G02B 2027/0154; G02B 2027/0127; G02B 2027/0185
See application file for complete search history.

(56) References Cited

U.S. PATENT DOCUMENTS

2016/0170226 A1\* 6/2016 Popovich ............. G02B 5/0252
362/606
2017/0011709 A1\* 1/2017 Kuwabara .............. B60K 35/00

FOREIGN PATENT DOCUMENTS

| JP | 2015215476 A | 12/2015 |
|---|---|---|
| WO | 199810584 A2 | 3/1998 |
| WO | 1998010584 A2 | 3/1998 |
| WO | 2014208164 A1 | 12/2014 |

OTHER PUBLICATIONS

International Search Report dated Jan. 23, 2018 filed in PCT/JP2017/039207.
Written Opinion of the International Searching Authority (Form PCT/ISA/237) dated Jan. 23, 2018 filed in PCT/JP2017/039207; English translation.

\* cited by examiner

VIRTUAL IMAGE DISPLAY OPTICAL SYSTEM AND IMAGE DISPLAY DEVICE

TECHNICAL FIELD

The present invention relates to a virtual image display optical system that displays a virtual image in front of a line of sight, and in which a projection position of the virtual image can be changed, and an image display device that uses the virtual image display optical system.

BACKGROUND ART

In general, a head-up display (HUD)) device in the prior art generates a virtual image at a position spaced away from a driver by a certain constant distance. Display contents by the HUD are limited to a vehicle speed, car navigation information and the like. Basically, the purpose of equipping a vehicle with a HUD is to minimize movements of a driver's sight line, and consequently to assist safer driving. However, in the meaning of safe driving assistance, providing only the display contents including the vehicle speed is not sufficient. Thus, it is more preferable to provide such a system that detects, for example, a vehicle, a walker, an obstacle and the like, which exist ahead of the driver, by a camera or a sensor, and causes the driver to notice danger through the HUD beforehand, thereby avoiding an accident before it happens. In order to realize such a system, it is considered that a danger signal is displayed so as to be superimposed on a see-through image that is, for example, a vehicle, a person, an obstacle or the like.

In the system that displays a danger signal in a superimposed manner as described above, there arises a problem that if a distance from a driver to a virtual image is constant, in a case where a position of eyes deviates, a position of a danger signal deviates from a position of an actual object, which causes the driver to misidentify the danger signal, and a problem that when a danger signal is displayed in a virtual image that is 2 m ahead so as to be superimposed on, for example, a danger that is 50 m ahead, a difference in focal position causes a sense of discomfort. As a technique for solving such problems, it is considered that a virtual image is superimposed on an actual object in such a manner that the superimposition also includes the depth direction. In this manner, as a technique for providing a virtual image with depth, there is a method disclosed in the undermentioned Patent Literature 1. The Patent Literature 1 discloses providing: a scanning-type image formation means such as a MEMS mirror; a diffusing screen; a projection means; and a movable means for changing a position of the diffusing screen, wherein a position of a virtual image is changed by changing the position of the diffusing screen. The main purpose of the Patent Literature 1 is to reduce movements of a sight line of a driver by making a virtual image position closer or farther considering that a person's watching distance changes depending on the speed of a vehicle. However, a danger at the time of driving exists regardless of whether a sight line is near or far. Therefore, it is preferable that a danger signal can be simultaneously displayed at both long and short distances. For this purpose, it is considered that a diffusing screen is driven at high speed, and images synchronized therewith are generated by an image formation means, thereby causing person's eyes to see as if the images are simultaneously displayed. However, it is difficult for the scanning-type image formation means to cope with display switching at a high frame rate. Therefore, the scanning-type image formation means is not suitable for a configuration in which virtual images are simultaneously displayed at a plurality of distances.

CITATION LIST

Patent Literature

Patent Literature 1: JP 2009-150947 A

SUMMARY OF INVENTION

The present invention has been made taking the above-described problems into consideration, and an object of the present invention is to provide a virtual image display optical system that is capable of substantially simultaneously displaying virtual images at a plurality of distances even with a simple configuration.

In addition, an object of the present invention is to provide an image display device that uses the above-described virtual image display optical system.

In order to achieve at least one of the above-described objects, a virtual image display optical system in which one aspect of the present invention is reflected is provided with: a display element; a projection optical system that enlarges an image formed on the display element; a diffusing screen that has a diffusing function, and is positioned on the light emission side of the projection optical system; and a virtual image forming optical system that converts an image on the diffusing screen into a virtual image, wherein the virtual image display optical system is further provided with a positioning changing device that changes a position of the diffusing screen.

In order to realize at least one of the above-described objects, the image display device in which one aspect of the present invention is reflected is equipped with the above-described virtual image display optical system.

BRIEF DESCRIPTION OF DRAWINGS

FIG. 2 is an enlarged side cross-sectional view illustrating a specific configuration example of a virtual image display optical system and the like.

FIGS. 18A and 18B are drawings illustrating a modified example of, for example, a diffusing screen that is built into the virtual image display optical system according to the second embodiment or the like.

DESCRIPTION OF EMBODIMENTS

First Embodiment

A virtual image display optical system, and an image display device into which the virtual image display optical system is built, according to the first embodiment of the present invention will be described below.

Figure 1A:
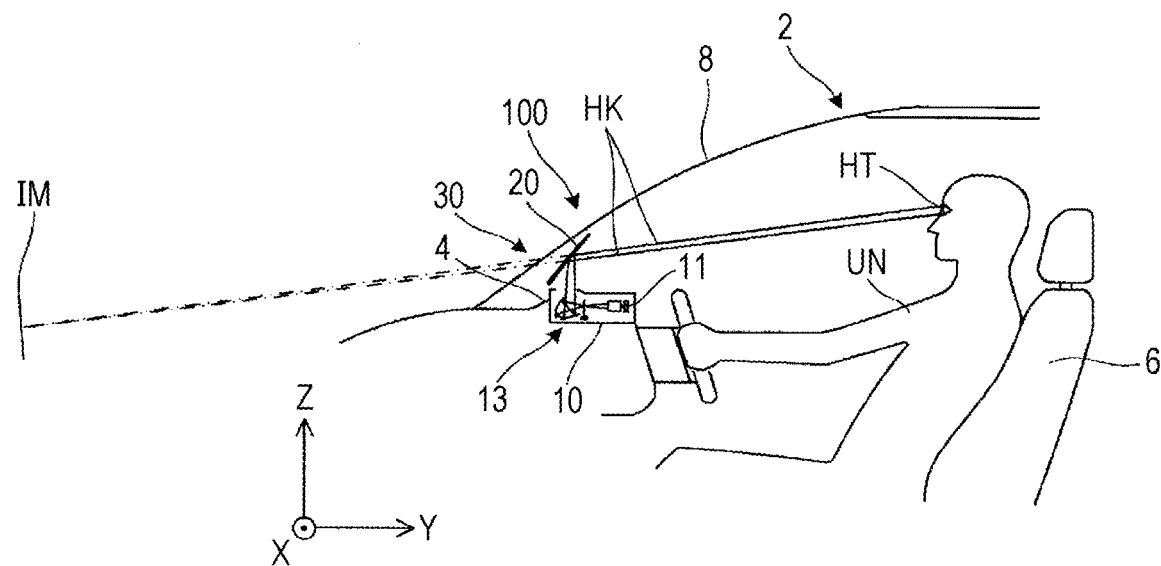
FIG. 1A is a side cross-sectional view illustrating a state in which a vehicle body is equipped with an image display device into which a virtual image display optical system according to a first embodiment is built.
Figure 1B:
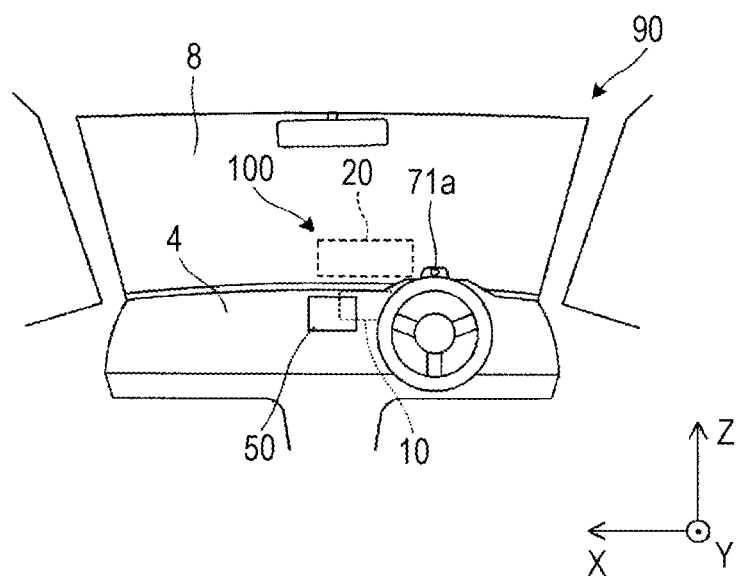
FIG. 1B is a front view illustrating the image display device as seen from the inside of a vehicle.

FIGS. 1A and 1B are a side cross-sectional view and a front view each conceptually illustrating an image display device 100 according to the present embodiment and a use state thereof. A vehicle body 2 is equipped with this image display device 100, for example, as a head-up display device. The image display device 100 is provided with a drawing unit 10, and a display screen 20. The image display device 100 displays image information, which is being displayed on the undermentioned display element 11 in the drawing unit 10, as a virtual image for a driver UN through a display screen 20.

The drawing unit 10 included in the image display device 100 is installed in a dashboard 4 of the vehicle body 2 so as to be embedded behind the display 50, and emits display light HK corresponding to an image that includes driving related information toward the display screen 20. The display screen 20 is also called a combiner, and is a concave mirror, or a plane mirror, having semi-permeability. The display screen 20 is vertically arranged on the dashboard 4 by a support at the lower end, and reflects the display light HK from the drawing unit 10 toward the rear of the vehicle body 2. In other words, in the case of the illustrated figure, the display screen 20 is installed separately from a front window 8, and is thus stand-alone. The display light HK reflected by the display screen 20 is led to an eye-box (not illustrated) corresponding to pupils HT of the driver UN who sits on a driver's seat 6 and a peripheral position thereof. The driver UN can observe the display light HK reflected by the display screen 20, in other words, a display image IM as a virtual image that exists in front of the vehicle body 2. Meanwhile, the driver UN can observe outside light that has passed through the display screen 20, in other words, real images such as the front scenery and automobiles. As the result, the driver UN can observe a display image (virtual image) IM that is superimposed on an outside image, or a see-through image, behind the display screen 20, the display image IM including the driving related information formed by the display light HK reflected on the display screen 20.

Figure 2:
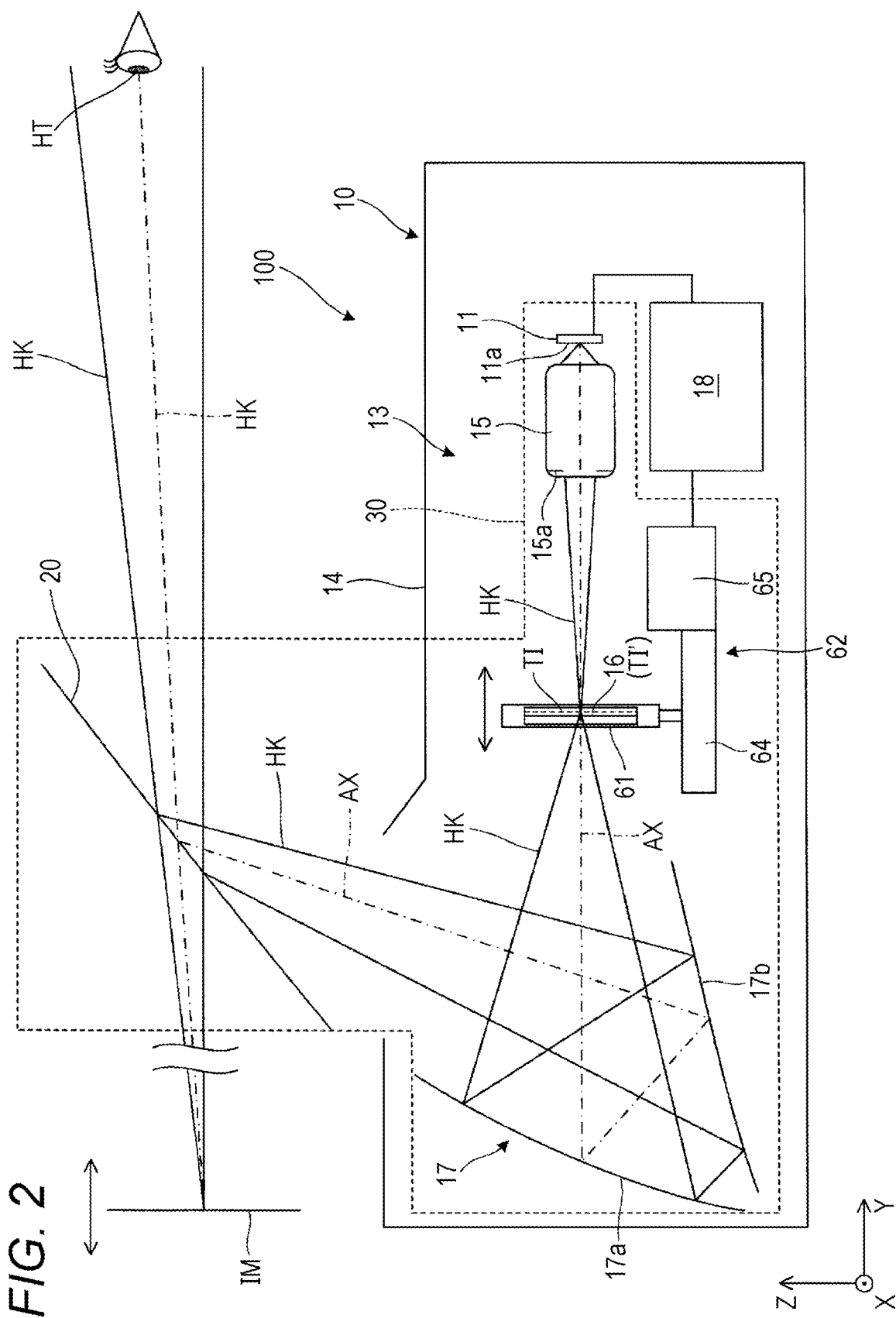

As shown in FIG. 2, the drawing unit 10 is provided with: a main body optical system 13 that is a virtual-image type enlarging imaging system, and includes the display element 11; a display control unit 18 that causes the main body optical system 13 to operate; and a housing 14 that stores the main body optical system 13 and the like. Among them, a combination of the main body optical system 13 and the display screen 20 constitute a virtual image display optical system 30.

The main body optical system 13 is provided with not only the display element 11 but also: a projection optical system 15 that is capable of forming an intermediate image TI by enlarging an image formed on the display element 11; a diffusing screen 16 that is arranged at an expected imaging position of the intermediate image TI or the proximity thereof (hereinafter referred to as imaging position); and a virtual image forming optical system 17 that converts an image on the diffusing screen 16 (including not only the intermediate image TI itself, but also an image that is slightly out of focus resulting from a deviation in position from the intermediate image TI; hereinafter referred to as forced intermediate image TI') into a virtual image.

The display element 11 has a two-dimensional display surface 11a. An image formed on the display surface 11a of the display element 11 is enlarged by the projection optical system 15 included in the main body optical system 13, and is then projected on the diffusing screen 16. In this case, by using the display element 11 that is capable of two-dimensional displaying, the projection optical system 15 enlarges the image formed on the display surface 11a of the display element 11, and therefore a projection image to be projected on the diffusing screen 16 can be switched at relatively high speed. The display element 11 may be a reflection-type element such as a digital mirror device (DMD) and a liquid crystal on silicon (LCOS), or a transmission-type element such as a liquid crystal. It should be noted that a backlight, a light emitting diode (LED) or a semiconductor laser may be used as a light-emitting element that illuminates a liquid crystal or the like. In particular, if a DMD is used for the display element 11, it becomes easy to switch an image at high speed while maintaining brightness, and therefore it is advantageous at the time of displaying that requires a change in virtual image distance or projection distance. It should be noted that the display element 11 operates at a frame rate of 30 fps or more. This makes it easy to show as if a plurality of display images (virtual images) IM is simultaneously displayed at different projection distances.

The projection optical system 15 is a fixed-focus lens system, and has a plurality of lenses although illustration is omitted. The projection optical system 15 enlarges and projects the image, which has been formed on the display surface 11a of the display element 11, on the diffusing screen 16 as the forced intermediate image TI' at an appropriate magnification ratio. It should be noted that the projection optical system 15 includes a diaphragm 15a that is arranged most on the diffusing screen 16 side of this projection optical system 15. In this manner, by arranging the diaphragm 15a, settings and adjustments of the F-number on the diffusing screen 16 side of the projection optical system 15 become relatively easy.

The diffusing screen 16 is a diffusing plate for controlling a light distribution angle to be a desired angle, and forms the forced intermediate image TI' at an imaging position (in other words, an expected imaging position of the intermediate image TI or the proximity thereof). As the result, by moving the diffusing screen 16 in a direction of an optical axis AX, a position of the forced intermediate image TI' can also be moved in the direction of the optical axis AX. For example, obscured glass, a lens diffusing plate, a microlens array or the like can be used as the diffusing screen 16. The diffusing screen 16 is supported by a support frame part 61, and reciprocates in the direction of the optical axis AX by being driven by a positioning changing device 62. In this case, since the diffusing screen 16 can be configured to have a single plate shape, the optical system can be miniaturized, and a virtual image distance can be continuously changed according to a position of the diffusing screen 16.

The virtual image forming optical system 17 enlarges the forced intermediate image TI', which has been formed on the diffusing screen 16, in cooperation with the display screen 20, and forms the display image IM as a virtual image in front of the driver UN. The virtual image forming optical system 17 is formed by at least one mirror. However, in the example illustrated in the figure, the virtual image forming optical system 17 includes two mirrors 17a, 17b.

In the main body optical system 13 described above, providing the diffusing screen 16 enables not only to form the forced intermediate image TI' that can be moved in the direction of the optical axis AX, but also to enhance a light utilization efficiency of the optical system while ensuring a viewing angle and an eye-box size. Incidentally, when a light distribution angle of diffusion by the diffusing screen 16 is too narrow, the eye-box size is decreased. In contrast, when the light distribution angle of diffusion by the diffusing screen 16 is made too wide, it is necessary to decrease an F-value of the virtual image forming optical system 17 in order to increase the light utilization efficiency, which causes a focal depth to decrease, and consequently a displayable distance range is narrowed.

The positioning changing device 62 that is provided in association with the diffusing screen 16 is used to move the diffusing screen 16 and the forced intermediate image TI' to desired positions along the optical axis AX. The positioning changing device 62 includes: a guide unit 64 that movably guides the support frame part 61 in the direction of the optical axis AX; and a drive unit 65 that reciprocates the support frame part 61 in the direction of the optical axis AX at a desired speed together with the diffusing screen 16. Moving the diffusing screen 16 along the optical axis AX by the positioning changing device 62 enables to increase or decrease a distance between an observer and the display image IM as the virtual image that is formed behind the display screen 20 by the virtual image forming optical system 17. In this manner, by changing a position of the projected display image IM so as to move backward and forward, and by adapting display contents to correspond to the position thereof, the display image IM is changed while the virtual image distance to the display image IM is changed. Consequently, the display image IM that is a series of projection images can be three-dimensionally displayed. Here, a moving range within which the diffusing screen 16 is moved along the optical axis AX corresponds to an expected imaging position of the intermediate image TI or the proximity thereof. However, it is preferable that the moving range falls within a range of the focal depth on the diffusing screen 16 side of the projection optical system 15. This enables to bring both of a state of the forced intermediate image TI' and an imaging state of the display image IM as a virtual image into an excellent state of being substantially in focus.

It is preferable that the moving speed of the diffusing screen 16 is a speed that is capable of showing as if the display image IM as the virtual image is simultaneously displayed at a plurality of positions or at a plurality of virtual image distances. For example, assuming that the display image IM is successively projected in three stages of a long distance, a middle distance and a short distance, when the display element 11 is caused to perform displaying at 90 fps, displaying of the display image IM at each distance (for example, the long distance) is switched at 30 fps, and consequently displaying of the display image IM at the middle distance and that at the short distance are performed in a parallel manner, and switching is recognized as being continuously performed. It should be noted that as clearly understood from the above, the moving speed of the diffusing screen 16 is set so as to be synchronized with the display operation of the display element 11. This enables to display, at a plurality of distances, a plurality of virtual images corresponding to situations of the respective distances.

Incidentally, the positioning changing device 62 according to the present embodiment reciprocates the diffusing screen 16 along the optical axis AX. However, reciprocating motion by, for example, a motor repeats acceleration and deceleration. Therefore, a considerable load is placed on the motor, which causes heat to be easily generated. As the result, it is assumed that motion velocity cannot be achieved as expected. As a means for solving this disadvantage, it is considered that a spring is inserted into the guide unit 64 to assist acceleration and deceleration by the elasticity thereof. Alternatively, using a cam structure, a slider crank mechanism or the like to change rotary motion to reciprocating motion is also considered as one means.

The virtual image forming optical system 17 satisfies the following conditional expression (1):

$$2 \leq FOV/(m \times H) \leq 4 \tag{1}.$$

Where the value FOV represents a horizontal directional viewing angle [rad] of the virtual image forming optical system 17, the value m represents an optical magnification of the projection optical system 15, and the value H represents a horizontal directional length [m] of the display element 11. Here, the horizontal directional length means a lateral direction, or an X direction, in which the eyes of the driver UN line up. By configuring the virtual image display optical system 30 to fall within a range that satisfies the above-described conditional expression (1), it is possible to realize the small-sized, high-magnification and high-performance virtual image display optical system 30. In addition, even if the moving distance of the diffusing screen 16 is not made so long, a moving range of the display image IM that is a virtual image can be made relatively large. Adapting the value of FOV/(m×H) to be an upper limit of the conditional expression (1) or less makes it easy to avoid problems of, for example, an increased size of the optical system, and a distortion occurring in the virtual image or the display image IM. Meanwhile, adapting the value of FOV/(m×H) to be a lower limit of the conditional expression (1) or more makes it possible to ensure a sufficient viewing angle, which improves matching with safe driving assistance. In a specific manufacturing example, the horizontal directional viewing angle FOV is set at 0.279 [rad](16°), the optical magnification m of the projection optical system 15 is set at 9.6, and the horizontal directional length H of the display element 11 is set at 0.00866 [m]. In this case, the value FOV/(m×H) of the conditional expression (1) becomes 3.36.

The virtual image forming optical system 17 satisfies the following conditional expression (2):

$$2 \le M/L \le 4 \qquad (2).$$

Where the value M represents an optical magnification of the virtual image forming optical system 17, and the value L represents a distance [m] from an observation position at which the eyes, or the pupils HT, of the driver UN exist to the display image IM that is a virtual image. By configuring the virtual image display optical system 30 to fall within a range that satisfies the above-described conditional expression (2), it is possible to realize the small-sized, high-magnification and high-performance virtual image display optical system 30. In addition, even if the moving distance of the diffusing screen 16 is not made so long, a moving range of the virtual image or a moving range of the display image IM can be made relatively large. Adapting the value of M/L to be an upper limit of the conditional expression (2) or less makes it easy to avoid problems of, for example, an increased size of the optical system, and a distortion occurring in the virtual image or the display image IM. Meanwhile, adapting the value of M/L to be a lower limit of the conditional expression (2) or more makes it possible to ensure a sufficient viewing angle, which improves matching with safe driving assistance. In a specific manufacturing example, the optical magnification M of the virtual image forming optical system 17 is set at 35.3, and the value L from the observation position to the virtual image is set at 10 [in]. In this case, the value M/L of the conditional expression (2) becomes 3.53. In addition, the optical magnification M of the virtual image forming optical system 17 is set at 16.8, and the value L from the observation position to the virtual image is set at 5 [in]. In this case, the value M/L of the conditional expression (2) becomes 3.36.

The projection optical system 15 satisfies the following conditional expression (3):

$$0.8 \le 2 \times F \times P \times m^2/\delta \le 1.2 \qquad (3).$$

Where the value F represents an F-number on the display element 11 side of the projection optical system 15, the value P represents a pixel pitch [mm] of the display element 11, and the value δ represents a diffusing-screen moving distance [mm] required to obtain a desired virtual image distance range. By being configured to fall within a range that satisfies the above-described conditional expression (3), it is possible to ensure a sufficient focal depth on the diffusing screen 16 side, and therefore a clear virtual image can be displayed within a desired virtual image distance range.

Figure 3:
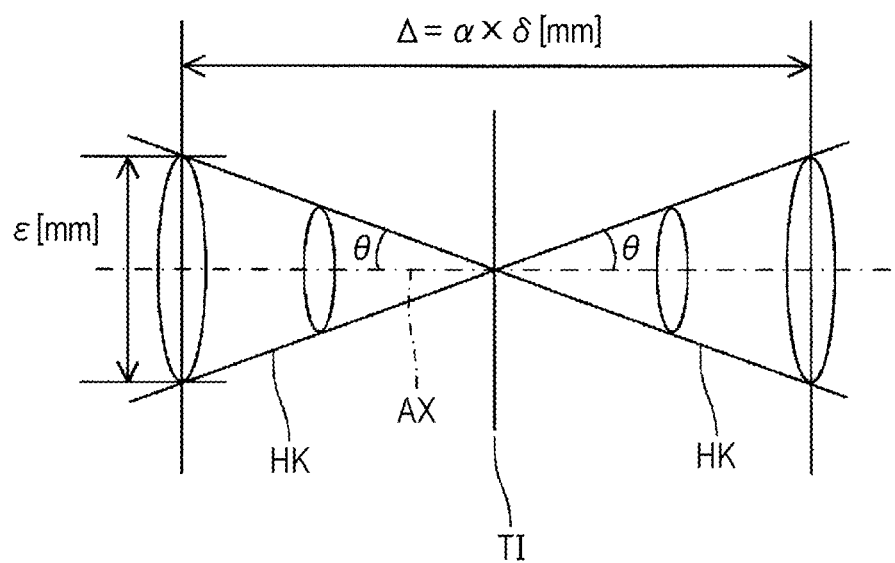
FIG. 3 is an enlarged view illustrating conditions for displaying a clear image by the virtual image display optical system.

FIG. 3 is a conceptual cross-sectional view illustrating the conditional expression (3), and enlarges an imaging position of the intermediate image TI by the projection optical system 15. In order to ensure a moving distance δ[mm] of the diffusing screen 16 required to obtain a desired virtual image distance range, on the assumption that a range of a focal depth, or a width, related to the display light HK is Δ[mm], a diameter ε[mm] of a permissible circle of confusion, which is considered to be resolving, is given as approximately m×P. Therefore, on the assumptions that an F-number on the image side of the projection optical system 15 is F', and that a convergent angle or divergence angle of the display light HK is θ, the following expression is obtained:

$$m \times F = F' = 1/(2 \cdot \sin \theta) \approx 1/(2 \cdot \tan \theta) = \Delta/2\varepsilon = \Delta/2mP.$$

If this expression is changed to an expression for giving a range Δ of the focal depth, the following expression is obtained:

$$\Delta \approx 2 \times F \times P \times m^2.$$

Here, if the range Δ of the focal depth is represented as α×δ (α is a coefficient) by using the moving distance δ of the diffusing screen 16, the following expression is obtained:

$$A \approx 2 \times F \times P \times m^2/\delta.$$

In other words, it is revealed that if the value $2 \times F \times P \times m^2/\delta$ is set at a value close to 1, the diffusing screen 16, that is to say, the forced intermediate image TI', can be moved over a relatively wide range that effectively utilizes the range Δ of the focal depth of the projection optical system 15. In addition, it is revealed that even if a bundle of rays for imaging the display light HK is narrowed, which causes a focus to deviate, moving the diffusing screen 16 within a range that is considered to be in focus will exert little influence on imaging.

In a specific manufacturing example, the F-number on the display element 11 side of the projection optical system 15 is set at 10.7, the pixel pitch of the display element 11 is set at 0.0076 [mm], and the moving distance δ of the diffusing screen 16 is set at 15 [mm]. In this case, the value $2 \times F \times P \times m^2/\delta$ of the conditional expression (3) becomes 0.999.

Figure 4A:
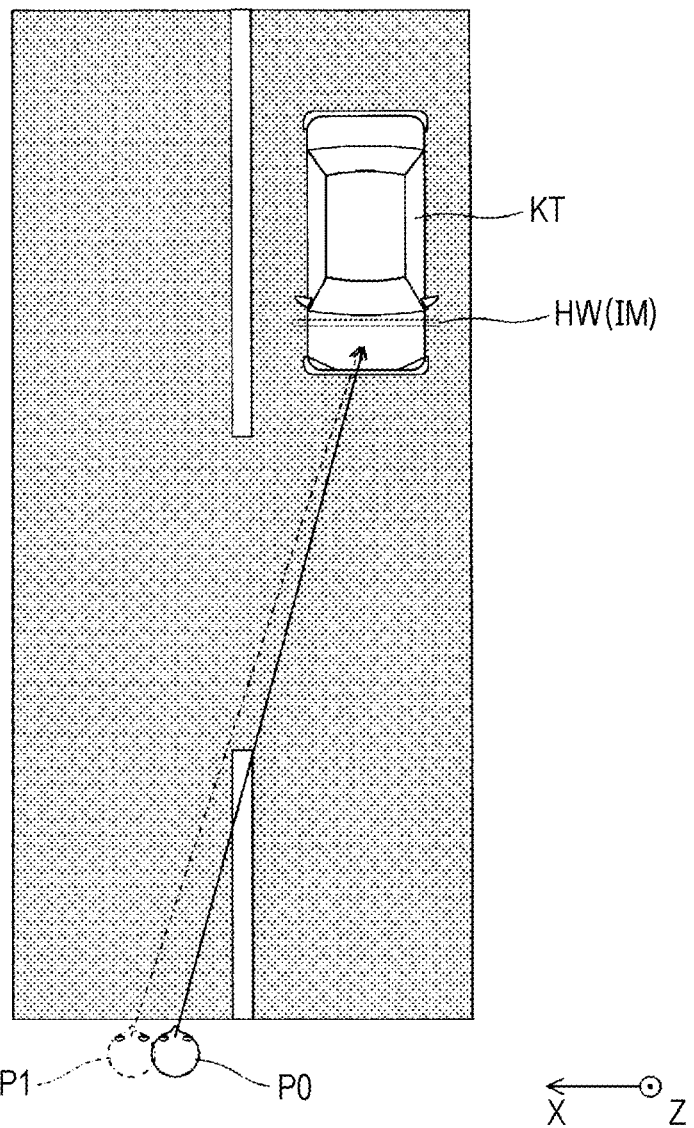
FIGS. 4A and 4B are drawings each illustrating arrangement relationship between a virtual image position by the virtual image display optical system according to the embodiment and a sight through object.
Figure 4B:
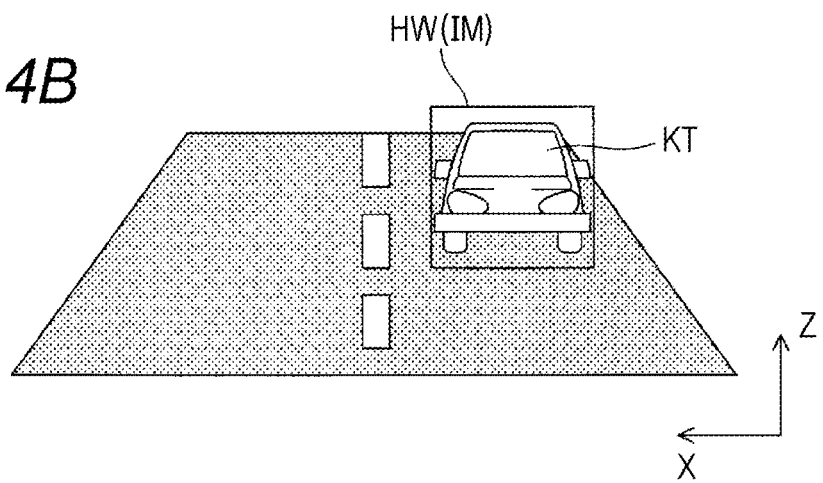

FIG. 4A is a conceptual plan view illustrating displaying by the virtual image display optical system 30 according to an embodiment; and FIG. 4B is a drawing illustrating the appearance of displaying corresponding to FIG. 4A. As shown in FIG. 4A, a case where the display frame HW that is the display image IM is formed at a position of the target object KT (in this case, an automobile that is travelling along the opposite traffic lane) observed by the driver UN or in proximity thereto will be described. The display frame HW like this is a virtual image serving as a danger alarm signal or the like, and indicates a result of identifying, for example, an automobile, a bicycle, a walker or the like that is approaching ahead. With respect to the display frame HW, in this case, as shown in FIG. 4A, the display frame HW is projected in proximity to the target object KT. Therefore, as shown in FIG. 4B, not only the driver UN who is located at a standard position P0, but also the driver UN who has changed the posture to a fluctuating position P1 at which a head position is moved, can see the display frame HW and the target object KT as if the display frame HW substantially overlaps the target object KT substantially without deviation. In the above description, the display image IM is the display frame HW. However, the display image IM is not limited to the display frame HW. The display image IM can be used for various displaying purposes related to driving and target objects approaching ahead.

Figure 5A:
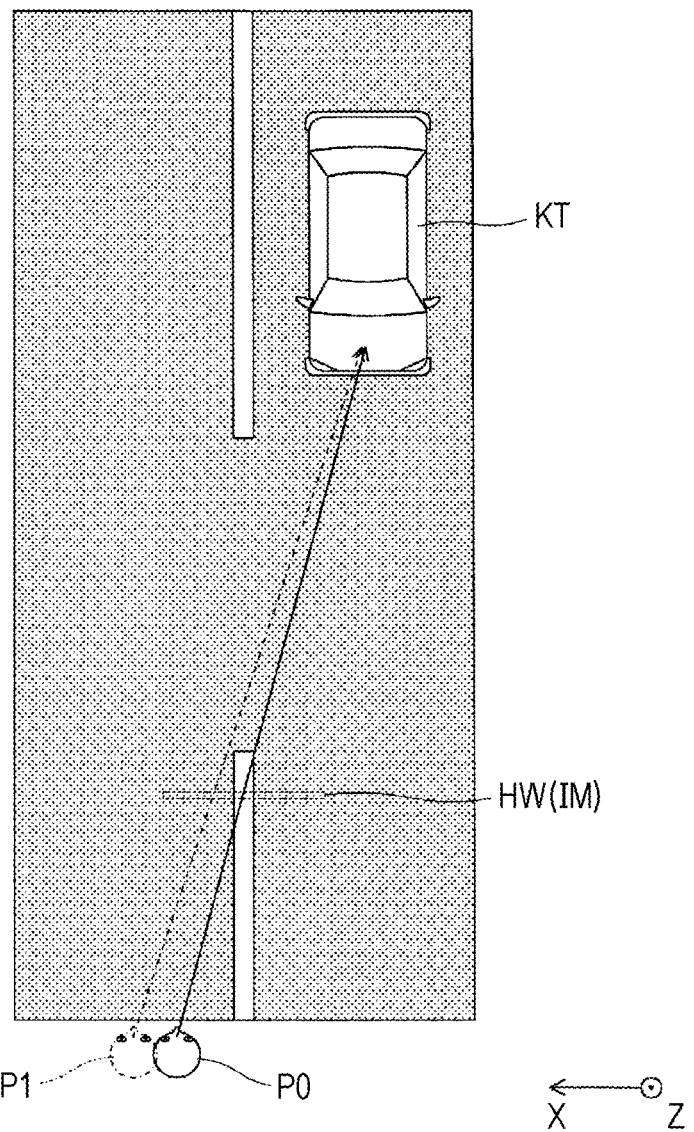
FIGS. 5A and 5B are drawings each illustrating arrangement relationship between a virtual image position by a virtual image display optical system of a comparative example and a sight through object.
Figure 5B:
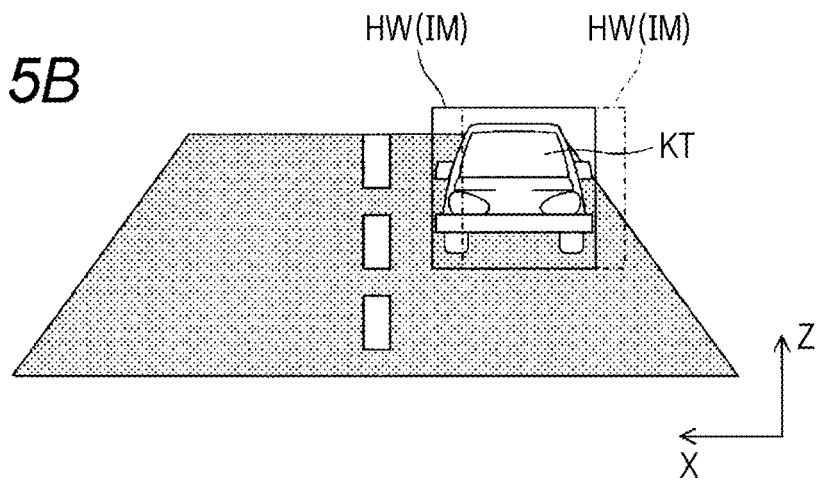

FIG. 5A is a conceptual plan view illustrating displaying by the virtual image display optical system 30 according to a comparative example; and FIG. 5B is a drawing illustrating the appearance of displaying corresponding to FIG. 5A. As shown in FIG. 5A, a case where the display frame HW that is the display image IM is formed at a fixed position irrespective of the target object KT that is being observed by the driver UN will be described. In this case, as shown in FIG. 5A, the display frame HW is projected considerably on this side of the target object KT. Therefore, as shown in FIG. 5B, even if the driver UN who is located at the standard position P0 can see the display frame HW and the target object KT as if the display frame HW substantially overlaps the target object KT substantially without deviation, the driver UN who has changed the posture to the fluctuating position P1 sees the display frame HW at a position that largely deviates from the target object KT in the lateral direction in which the eyes line up. Consequently, there is an increasing possibility that the display frame HW will be misidentified.

Figure 6:
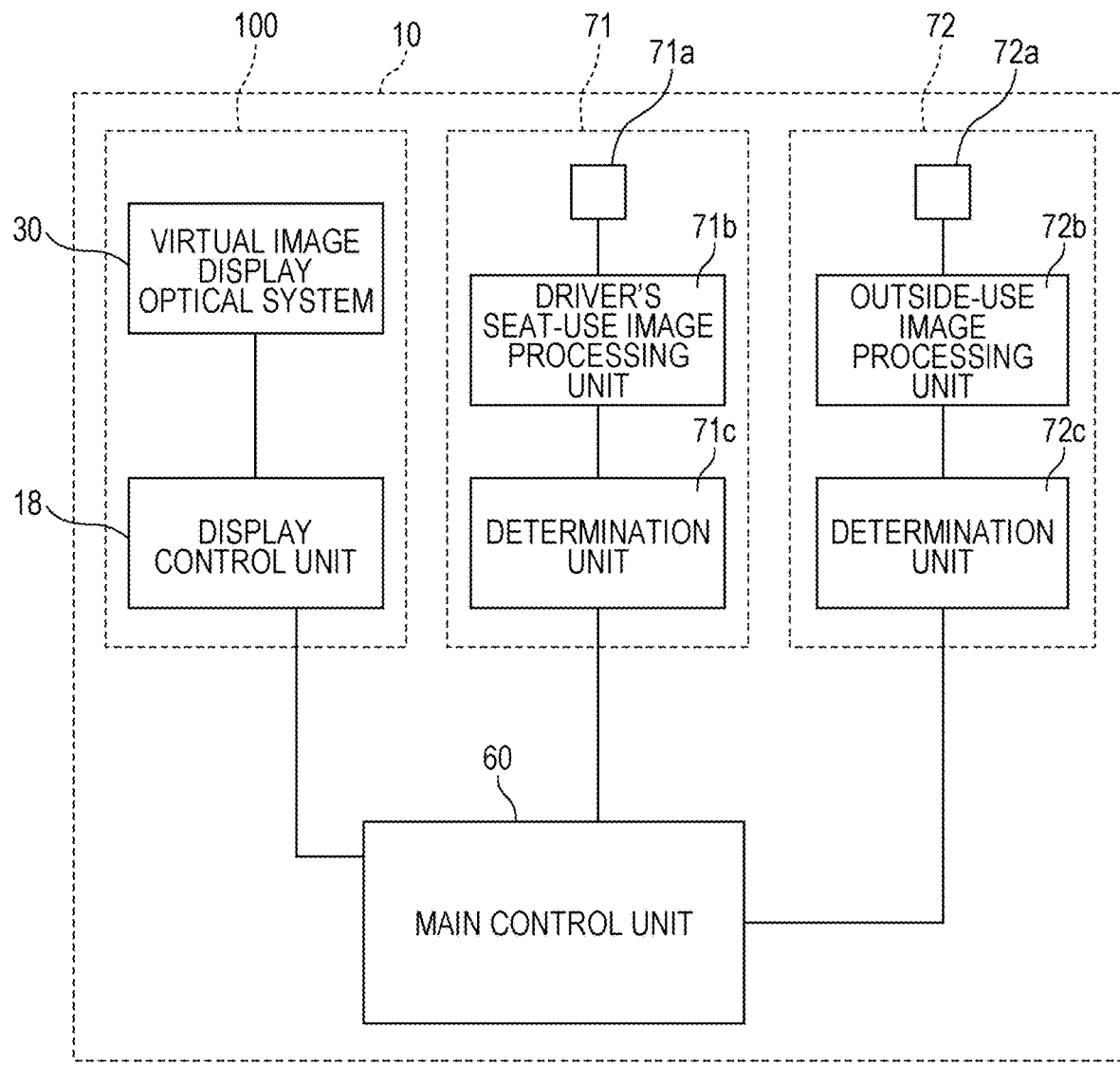
FIG. 6 is a block diagram illustrating a moving object-use display system that includes an image display device.

FIG. 6 is a block diagram illustrating a moving object-use display system 200. The moving object-use display system 200 includes, as a part thereof, the image display device 100. This image display device 100 has the structure shown in FIG. 2, and therefore explanation thereof will be omitted here. The moving object-use display system 200 shown in FIG. 6 is built into an automobile or the like that is a moving object.

The moving object-use display system 200 is provided with not only the image display device 100, but also a driver detection unit 71, an environment monitoring unit 72, and a main control unit 90.

The driver detection unit 71 is a part for detecting the existence of the driver UN and a viewpoint position thereof, and is provided with a driver's seat-use camera 71a, a driver's seat-use image processing unit 71b, and a determination unit 71c. The driver's seat-use camera 71a is installed on the dashboard 4 in the vehicle body 2, at a position in the front of the driver's seat 6 (refer to FIG. 1B), and takes an image containing the head of the driver UN and the surrounding thereof. The driver's seat-use image processing unit 71b subjects the image taken by the driver's seat-use camera 71a to various image processing such as brightness correction, thereby facilitating processing in the determination unit 71c. The determination unit 71c extracts or cuts out objects from a driver's seat image received via the driver's seat-use image processing unit 71b to detect the head and eyes of the driver UN. Subsequently, the determination unit 71c determines, from depth information that is associated with the driver's seat image, whether or not the head of the driver UN exists in the vehicle body 2, and calculates a spatial position of the eyes of the driver UN (as the result, a direction of a sight line).

The environment monitoring unit 72 is a part for identifying an automobile, a bicycle, a walker or the like that is approaching ahead, and is provided with an outside-use camera 72a, an outside-use image processing unit 72b, and a determination unit 72c. The outside-use camera 72a is installed at a proper position inside and outside the vehicle body 2, and takes an outside image of the front, lateral and the like of the driver UN or the front window 8. The outside-use image processing unit 72b subjects the image taken by the outside-use camera 72a to various image processing such as brightness correction, thereby facilitating processing in the determination unit 72c. The determination unit 72c extracts or cuts out objects from an outside image received via the outside-use image processing unit 72b to detect whether or not a target object KT such as an automobile, a bicycle and a walker exists (refer to, for example, FIG. 4A), and calculates a spatial position of the target object KT in front of the vehicle body 2 from depth information that is associated with the outside image.

It should be noted that although illustration is omitted, the driver's seat-use camera 71a and the outside-use camera 72a are, for example, compound-eye-type three-dimensional cameras. In other words, both of the cameras 71a, 72a are each formed by arranging camera elements in a matrix form, each camera element being constituted of an imaging lens and an image capturing element such as a CMOS as a set, and each have a driving circuit for the image capturing element. The plurality of camera elements that form each of the cameras 71a, 72a are configured to put respective focuses on, for example, positions that differ in a depth direction, or are configured to detect relative parallaxes. By analyzing a state (a focus state, a position of an object, etc.) of an image obtained from each camera element, a distance to each area or object in the image can be determined.

It should be noted that even if a combination of a two-dimensional camera and an infrared distance sensor is used as an alternative to the compound-eye-type cameras 71a, 72a as described above, depth-direction distance information related to each part in a screen containing the taken image can be obtained. In addition, by using a stereo camera in which two two-dimensional cameras are separately arranged, as an alternative to the compound-eye-type cameras 71a, 72a, depth-direction distance information related to each part (an area or an object) in a screen containing the taken image can be obtained. Besides the above, even by using a single two-dimensional camera to capture an image while changing a focal length at high speed, depth-direction distance information related to each part in a screen containing the taken image can be obtained.

The display control unit 18 causes the virtual image display optical system 30 to operate under the control of the main control unit 90, and to display a three-dimensional display image IM in which a virtual image distance or a projection distance changes behind the display screen 20. From display information that includes a display shape and a display distance, which has been received from the environment monitoring unit 72 through the main control unit 90, the display control unit 18 generates the display image IM to be displayed by the virtual image display optical system 30. The display image IM can be used as, for example, a sign like a display frame HW (refer to FIG. 4B) that is provided for a target object KT, such as an automobile, a bicycle and a walker, existing behind the display screen 20, and that is located therearound in the depth position direction.

The display control unit 18 receives a detection output related to the existence of the driver UN and a position of eyes from the driver detection unit 71 through the main control unit 90. This enables automatic start and stop of projecting the display image IM by the virtual image display optical system 30. In addition, the display image IM can also be projected only in a direction of a sight line of the driver UN. Moreover, highlighted projection can be performed; for example, only the display image IM in the direction of the sight line of the driver UN is made bright or is blinking.

The main control unit 90 plays a role in harmonizing operations of the image display device 100, the environment monitoring unit 72 and the like, and adjusts spatial arrangement of the display frame HW projected by the virtual image display optical system 30 so as to be aligned to a spatial position of the target object KT detected by the environment monitoring unit 72.

According to the image display device 100 or the virtual image display optical system 30 described above according to the first embodiment, virtual images can be discretely or continuously displayed at a plurality of distances by changing a position of the diffusing screen 16 along the optical axis AX at high speed, for example, within a range of the focal depth on the diffusing screen 16 side of the projection optical system 15. This enables to superimpose a virtual image (for example, the display frame HW) serving as a danger alarm signal or the like on the target object KT that is seen through in the depth direction as well, in other words, an actual object or a see-through image. As the result, even if a position of eyes or a focal position changes from a distant place to a near place, occurrence of a deviation between a virtual image and an actual object can be suppressed. Thus, in a case where the virtual image display optical system 30 is applied to a driving assistance system like the moving object-use display system 200, safety of the system can be further enhanced.

Second Embodiment

An image display device or a virtual image display optical system according to a second embodiment will be described below. It should be noted that the image display device and the like according to the second embodiment is a modification of the image display device and the like according to the first embodiment, and therefore matters that are not particularly described are similar to those in the first embodiment.

Figure 7:
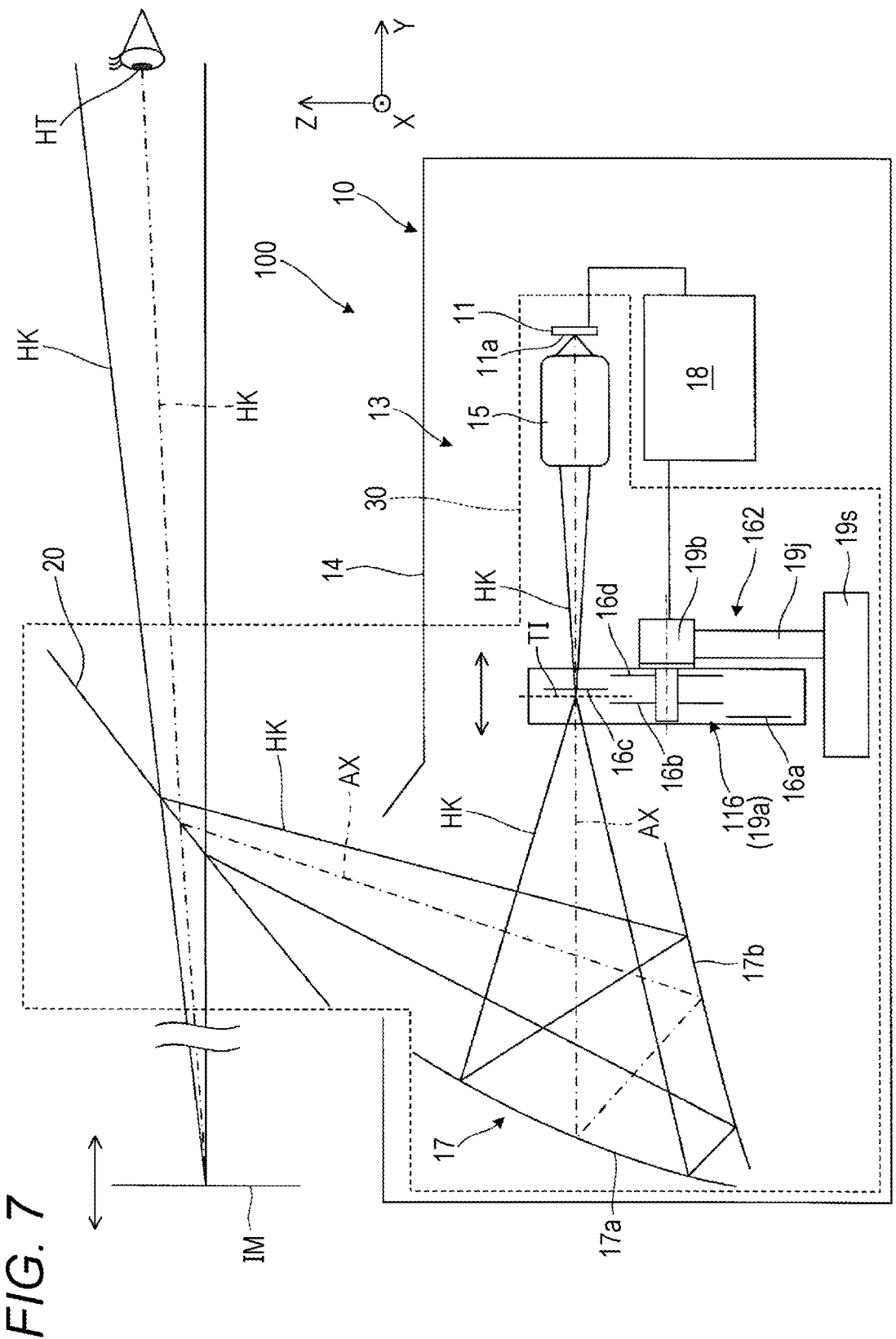
FIG. 7 is a drawing illustrating a virtual image display optical system according to a second embodiment.

As shown in FIG. 7, in the case of the image display device 100 according to the second embodiment, a rotating body 19a that is a diffusing screen 116 (including the undermentioned supporting body 19f as well) rotates at constant speed by being driven by a rotation driving device 19b provided in the positioning changing device 162. The rotating body 19a includes a plurality of diffusion regions 16a to 16d. These diffusion regions 16a to 16d differ in position related to a direction of the optical axis AX. However, the diffusion regions 16a to 16d are successively arranged at an imaging position (in other words, an expected imaging position of the intermediate image TI or the proximity thereof) of the projection optical system 15 along with the rotation of the rotating body 19a.

As with the image display device 100 according to the present embodiment, a load placed on a driving mechanism in a case where the diffusing screen 116 is rotationally driven is lower than that placed thereon in a case where the diffusing screen is reciprocated. This enables high-speed and stable operation.

Figure 8A:
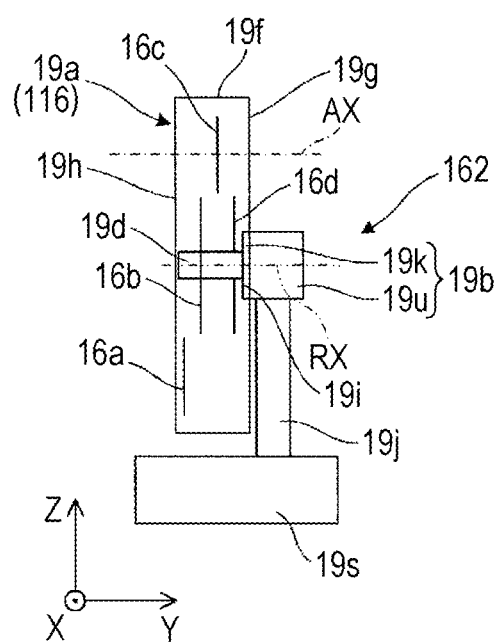
FIGS. 8A and 8B are a side cross-sectional view and a front view each illustrating a diffusing screen and the like included in the virtual image display optical system shown in FIG. 7.
Figure 8B:
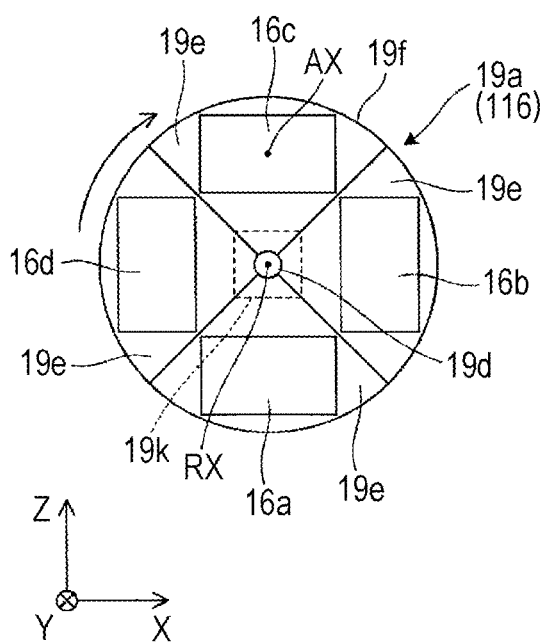

FIG. 8A is a side cross-sectional view illustrating the diffusing screen 116 and the positioning changing device 162; and FIG. 8B is a front view illustrating the diffusing screen 116. The rotating body 19a that is the diffusing screen 116 includes: a shaft part 19d through which a rotation axis RX passes, the rotation axis RX extending in parallel with the optical axis AX; the supporting body (or wheel) 19f that is arranged around the rotation axis RX by being supported by the shaft part 19d, and that has four supporting body regions 19e; and the four diffusion regions 16a to 16d that extend in a direction perpendicular to the optical axis AX by being held by the respective supporting body regions 19e. The rotation driving device 19b rotates the rotating body 19a through the shaft part 19d. The rotation driving device 19b is fixed to a support member 19j that is a support post. In addition, the support member 19j is fixed to a support part main body 19s that is a base.

The supporting body 19f is a wheel having a cylindrical shape, and is a hollow member in which a pair of end surfaces 19g, 19h on an optical path passing through the diffusing screen 116 have optical transparency. A central part on the end surface 19g side of the supporting body 19f is provided with a cylindrical concave recess 19i. An outer motor 19k that forms the rotation driving device 19b is mounted to the recess 19i. The supporting body 19f can be directly rotated by the outer motor 19k.

The rotation driving device 19b includes the outer motor 19k that is a rotating part, and a non-rotating part 19u. The non-rotating part 19u is fixed to the support member 19j.

The outer motor 19k has a coil inside, and has a permanent magnet and a motor housing case outside. The outer motor 19k is configured in such a manner that the permanent magnet and the housing case rotate together with the rotation axis RX. Incidentally, an inner motor, which is another type of motor, has a permanent magnet inside. The inner motor is configured in such a manner that the permanent magnet and the rotation axis rotate. Therefore, a rotating weight of the outer motor 19k is higher than that of the inner motor. Consequently, the moment of inertia around the shaft increases, and the driving torque also increases. Accordingly, stable rotational speed can be easily obtained from the outer motor 19k in comparison with the inner motor. In other words, the outer motor 19k is an advantageous motor for a 3D augmented reality (AR) HUD system that is required to unidirectionally rotate the diffusing screen 16 at constant speed. It should be noted that considering a life of the motor, it is preferable to use a brushless outer motor having no commutating brush among outer motors 19k.

The rotating body 19a is controlled to forwardly rotate by the outer motor 19k. This enables to simplify a rotation mechanism. In addition, the rotating body 19a can be stably driven. For example, in the case of the rotating body 19a having a size of 150 mm in diameter, and a weight of 300 to 400 g, the rotating body 19a is forwardly rotated at 3600 rpm as rated speed. In this case, if the small-size outer motor 19k, the output torque of which is 20 mN or less, is used, the rotating body 19a can be rotationally operated so as to function sufficiently.

With respect to the in-vehicle HUD, since a space for allowing the in-vehicle HUD to be mounted therein is limited, it is requested that the volume of the HUD be suppressed. As with the image display device 100 according to the present embodiment, from the viewpoint of the volume of the HUD, it is important for the 3D AR HUD, which is capable of changing the virtual image distance, to simplify a movable part mechanism (specifically, the rotation mechanism that includes the motor) for changing the virtual image distance.

By rotating the shaft part 19d using the rotation driving device 19b, the supporting body 19f also rotates around the rotation axis RX. As the result, the four diffusion regions 16a to 16d successively move on the optical axis AX, and each of the diffusion regions 16a to 16d moves so as to cross the optical axis AX. In this case, the arrangement relationship is adjusted in such a manner that the center of the diffusion regions 16a to 16d crosses the optical axis AX, and thus the positioning is performed. In a case where the shaft part 19d rotates, for example, clockwise viewing from the virtual image forming optical system 17 side or viewing from the front, the diffusion regions 16a to 16d are arranged on the optical axis AX in order from the diffusion region 16a to the diffusion region 16d. In the timing in which the center of the diffusion region 16a is arranged on the optical axis AX, the diffusion region 16a is the closest to the virtual image forming optical system 17, and an image that is displayed on the display element 11 at this time is displayed, as a virtual image, at the closest position in the rear of the display screen 20. In addition, in the timing in which the center of the diffusion region 16c is arranged on the optical axis AX, the diffusion region 16c is the farthest from the virtual image forming optical system 17, and an image that is displayed on the display element 11 at this time is displayed, as a virtual image, at the farthest position in the rear of the display screen 20. As clearly understood from the above, the image on the display element 11 is displayed in the timing in which the diffusion regions 16a to 16d are intermittently arranged on the optical axis AX like a strobe. In a case where the diffusing screen 16 is divided into the four diffusion regions 16a to 16d as with the image display device 100 according to the present embodiment, the number of projectable virtual image distances is only four. It should be noted that no projection/light emission is performed in parts other than the part of the diffusing screen 16.

Figure 9:
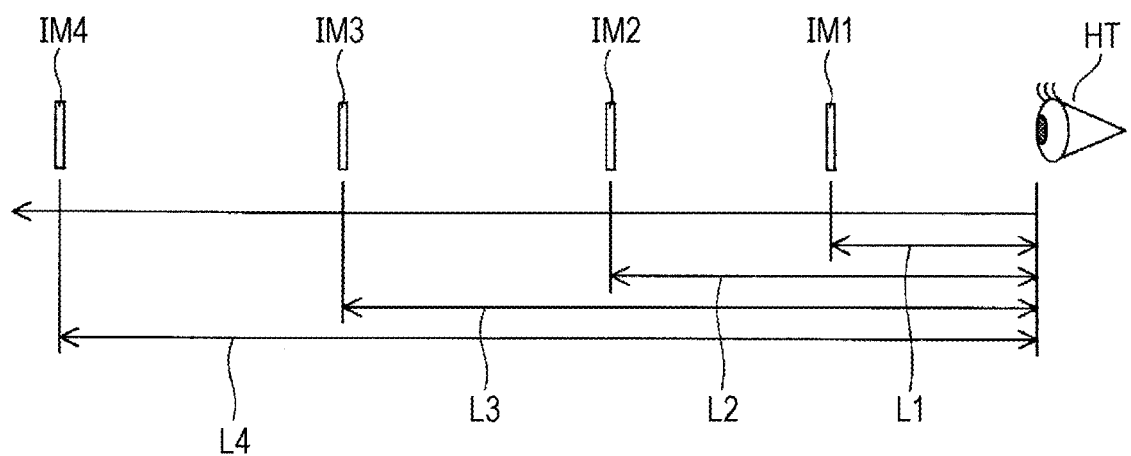
FIG. 9 is a conceptual diagram illustrating displaying of a virtual image at virtual image distance positions.

Four diffusion regions 16a to 16d successively cross an optical path during one rotation of the supporting body 19f. From the viewpoint of the virtual image distances, when the supporting body 19f is rotated once at high speed while the display element 11 is caused to continuously emit light, the display images IM1 to IM4 as virtual images can be visually recognized as if the display images IM1 to IM4 are simultaneously displayed at positions of virtual image distances L1, L2, L3, L4 as shown in FIG. 9. The virtual image distances L1 to L4 can be set at, for example, 3 m, 7 m, 20 m, and 70 m. In addition, if the number of diffusion regions provided is five or more, virtual images can be displayed at five or more virtual image distances.

Figure 10:
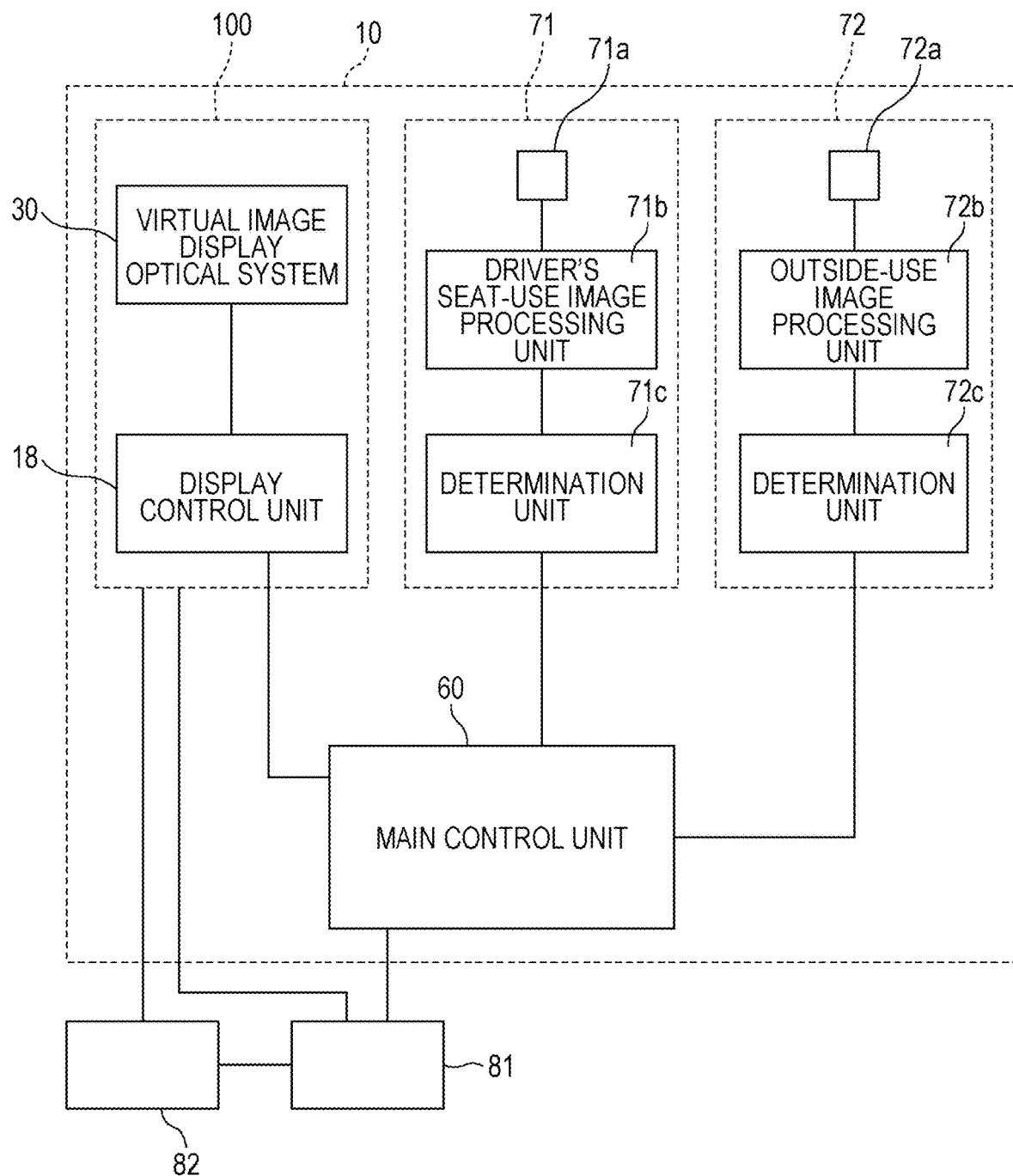
FIG. 10 is a block diagram illustrating a moving object-use display system that includes an image display device according to the second embodiment.

As shown in FIG. 10, the moving object-use display system 200 is provided with not only the image display device 100, but also the driver detection unit 71, the environment monitoring unit 72, the main control unit 90, a PID control unit 81, and a servo mechanism 82. By being provided with the PID control unit 81 and the like, the moving object-use display system 200 according to the present embodiment is configured to be capable of feedback control of the operation of the image display device 100.

The proportional-integral-differential (PID) control unit 81 operates the servo mechanism 82 under the control of the main control unit 90, and performs the feedback control of mainly the operation of the display element 11, and the operation of the diffusing screen 16. In a case where the light emission timing of the display element 11, the number of rotations or rotational speed of the rotating body 19a, or the like, has changed from a set value, the servo mechanism 82 performs automatic control so as to adjust the changed value to the set value through the PID control unit 81.

Here, the in-vehicle HUD, in particular, the AR HUD, is requested to inform the driver UN of a dangerous target instantaneously and correctly. In other words, it is requested that the driver UN be correctly informed of, without time delay, a position of the target object KT (refer to, for example, FIG. 4) that has been determined to be dangerous by the in-vehicle electronic control unit (ECU), from among pieces of object information that are continuously obtained from various sensors (for example, a single-eyed camera, a stereo camera, a laser imaging detection and ranging (Li-DAR), a far infrared rays (FIR) camera, an ultrasonic sensor, etc.) provided in a vehicle. From the viewpoint of the temporal accuracy and positional accuracy of the AR HUD, synchronization of the rotation of the rotating body 19a that includes the diffusing screen 16 with the timing of AR projection displaying is important. One rotation of the rotating body 19a covers from the shortest virtual image distance up to the longest virtual image distance. However, when the rotation of the rotating body 19a deviates from the timing of projection displaying, an image is displayed at a virtual image distance that differs from the distance of the actual target object KT, and therefore the positional accuracy of displaying with respect to the deviation in position of the head of the driver UN is not ensured.

For example, in a case where virtual images are displayed at five virtual image distances at a frame rate of 30 fps, one fifth of 30 fps, in other words, 150 fps, is required as a virtual image position resolution. Therefore, with the increase in the number of virtual image distances at which virtual images are displayed, the speed required to control the display timing becomes higher, and thus it gets more difficult to control the display timing. In addition, it is also difficult to keep the number of rotations of the motor always constant. The following two methods can be considered as measures for the above-described problem.

Figure 11:
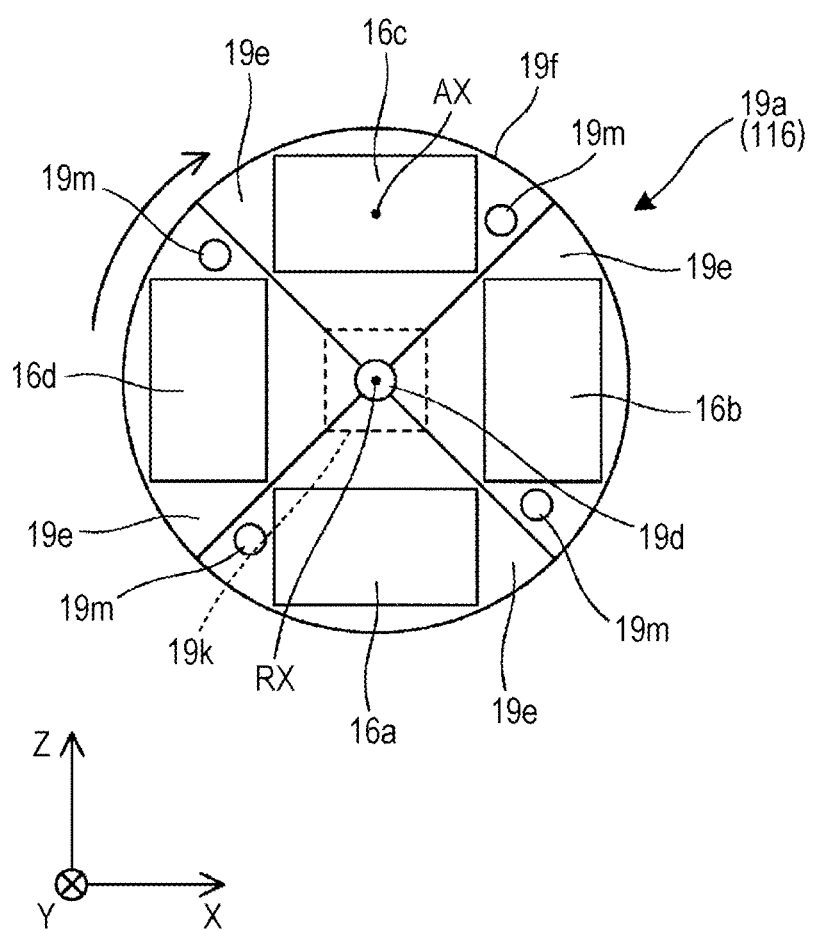
FIG. 11 is a drawing illustrating Hall elements provided in a rotating body.
Figure 12A:
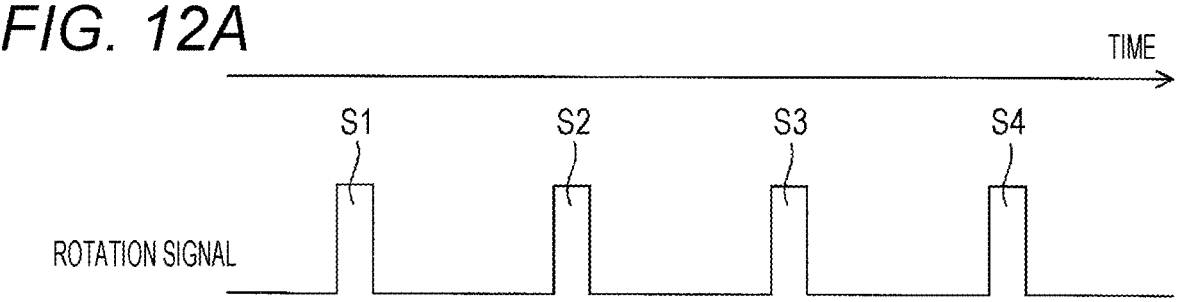
FIG. 12A is a drawing illustrating a rotation signal generated from the Hall elements.
Figure 12B:
FIGS. 12B and 12C are drawings each illustrating the light emission timing of a display element.
Figure 12C:
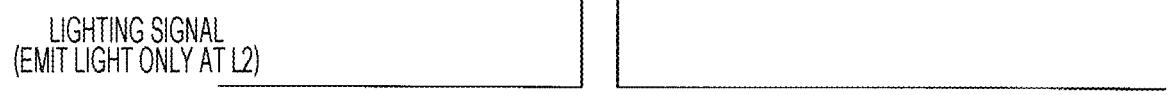

(Pattern 1) Method in which the light emission timing of the display element 11 is controlled The display element 11 is controlled by using rotation pulses of the rotating body 19a as triggers. Consequently, the display element 11 can be controlled according to the rotation of the outer motor 19k. As shown in FIG. 11, when the supporting body 19f is viewed from the front (in the direction of the optical axis AX), Hall elements 19m for detecting a rotation angle of the outer motor 19k are provided outside the diffusion regions 16a to 16d in the rotating body 19a. In an example illustrated in the figure, the Hall elements 19m are provided on the respective supporting body regions 19e corresponding to the four diffusion regions 16a to 16d of the rotating body 19a. A rotation signal generated by the rotation of the supporting body 19f is obtained as a pulse signal of each of the Hall elements 19m. FIGS. 12A to 12C are drawings each illustrating the relationship between the rotation signal and the light emission timing of the display element. In FIG. 12A, reference numerals S1 to S4 denote a rotation signal pulse corresponding to magnetism or a magnetic field occurring at each of the Hall elements 19m provided in the respective supporting body regions 19e corresponding to the diffusion regions 16a to 16d. Here, by making it possible to determine which position of the rotation signal corresponds to each pulse, lighting pulses (lighting signal) of the display element 11 can be generated in the appropriate timing by using the rotation signal pulses of the supporting body 19f as triggers as shown in FIGS. 12A and 12B. This enables the driver UN to visually recognize virtual images as if the virtual images are simultaneously displayed at the virtual image distances L1 to L4 shown in FIG. 9. In addition, as shown in FIG. 12C, if the display element 11 is caused to emit light only in the timing corresponding to the virtual image distance L2, it is also possible to make the driver UN visually recognize only the virtual image at the virtual image distance L2.

Figure 13A:
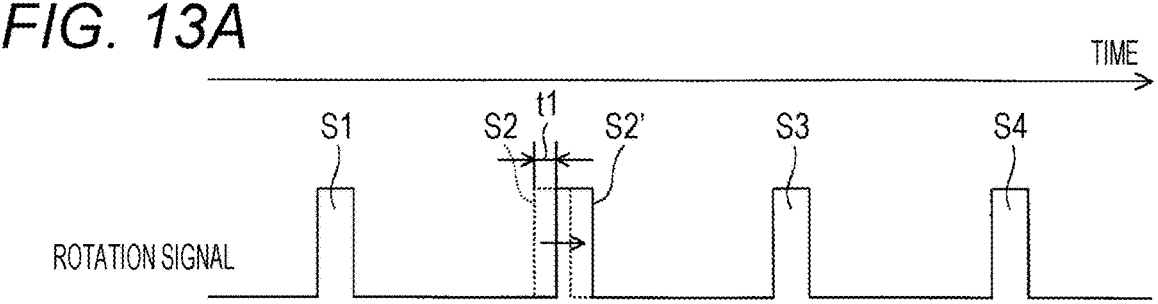
FIGS. 13A and 13B are drawings illustrating the number of rotations of a rotating body, and a synchronization method of the light emission timing of a display element, by a pattern 1.
Figure 13B:
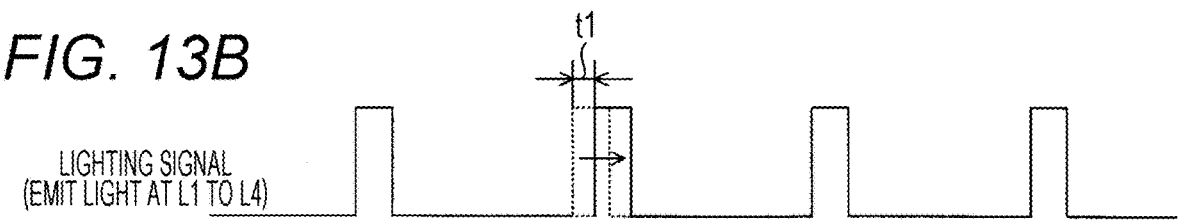

In the present method, as presented in FIGS. 13A and 13B, the number of rotations or rotational speed of the rotating body 19a is delayed by a time difference t1. In a case where the rotation signal pulse corresponding to the virtual image distance L2 is generated in the timing indicated by the reference numeral S2', the light emission timing that is the display timing of the display element 11 is delayed by the time difference that is the same as the time difference by which the above-described rotation signal pulse is delayed (that is to say, the time difference t1). As the result, the display element 11 can be caused to emit light in the timing corresponding to the virtual image distance L2. Here, the rotational speed of the rotating body 19a is always controlled so as to be kept at a set value, and therefore when the set value deviates, the light emission timing of the display element 11 is adjusted at the virtual image distance L3 and at subsequent ones as well.

Figure 14A:
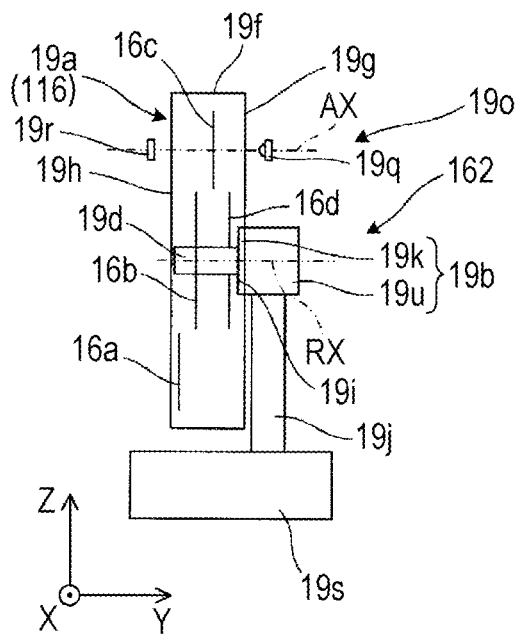
FIG. 14A is a drawing illustrating a rotary encoder that is provided around a rotating body.
Figure 14B:
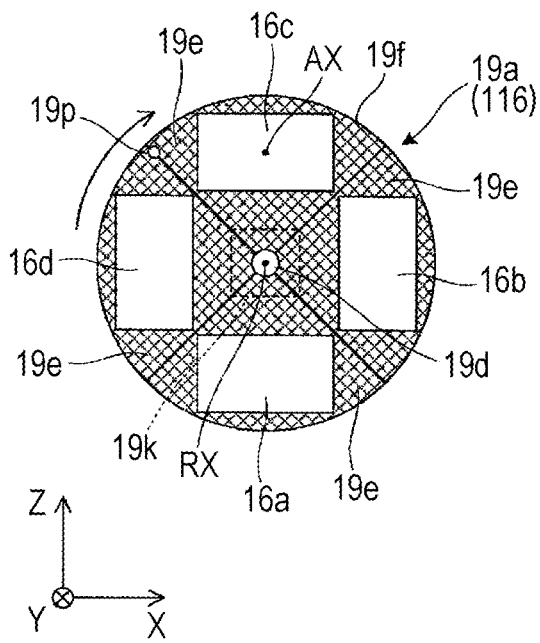
FIG. 14B is a diagram illustrating an opening for the rotary encoder.

It should be noted that in the present method, a rotary encoder 19o may be used as an alternative to the Hall elements 19m. Specifically, as shown in FIGS. 14A and 14B, the rotating body 19a is provided with an opening 19p, and the rotary encoder 19o that detects transmitted light by an optical sensor is used to detect the rotation of the rotating body 19a, thereby controlling virtual image displaying. The opening 19p is arranged in a part other than the diffusion regions 16a to 16d in the diffusing screen 116. In the example illustrated in the figure, the opening 19p is arranged in the supporting body region 19e between the diffusion regions 16c, 16d. However, the opening 19p may be arranged between other diffusion regions or at a position close to the central part of the rotating body 19a. An encoder-use light source unit 19q is provided at a position corresponding to the opening 19p on the light incident side of the rotating body 19a, and an encoder-use light receiving unit 19r is provided at a position corresponding to the opening 19p on the light emission side of the rotating body 19a.

While the rotating body 19a is rotated, when the opening 19p comes in front of the encoder-use light source unit 19q, the light amount of the encoder-use light receiving unit 19r becomes the maximum, and therefore a rotational position of the rotating body 19a can be known. In the example illustrated in the figure, light also passes through the diffusion regions 16a to 16d. However, a light diffusion effect causes the light amount of the encoder-use light receiving unit 19r corresponding to the diffusion regions 16a to 16d to become lower than the light amount of the encoder-use light receiving unit 19r corresponding to the opening 19p. As described above, the light emission of the display element 11 is controlled according to the timing in which the light amount of the encoder-use light receiving unit 19r becomes the maximum. Consequently, even when the number of rotations of the outer motor 19k deviates from the set number of rotations due to a disturbance or the like, the rotation of diffusing screen 16 can be correctly synchronized with the light emission timing of the display element 11. Incidentally, in FIG. 13B, mesh parts of the supporting body regions 19e are formed of a material that shields light. As a member that shields light, for example, polypropylene can be mentioned.

Figure 12D:
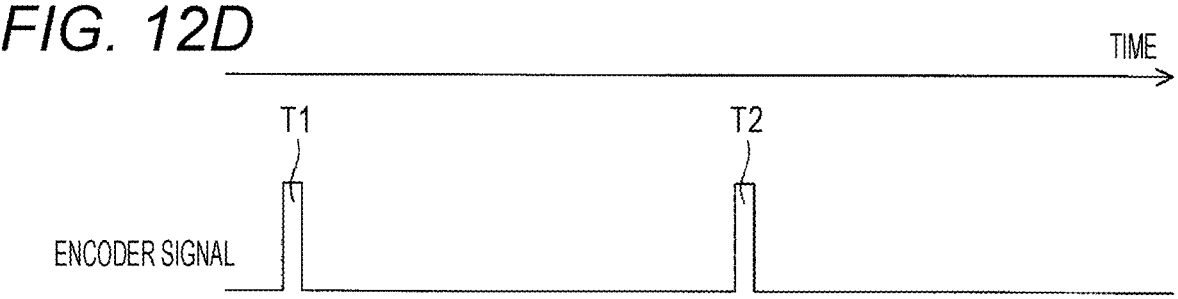
FIG. 12D is a drawing illustrating an encoder signal that is received by a rotary encoder light receiving unit.
Figure 12E:
FIGS. 12E and 12F are drawings each illustrating the light emission timing of a display element.
Figure 12F:
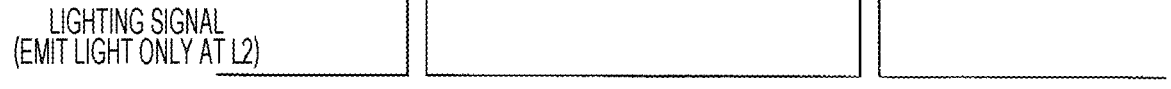

As shown in FIGS. 12D to 12F, in a case where the rotary encoder 19o is used as well, synchronizing the timing of an encoder signal with the timing of a lighting signal enables to display virtual images so as to be superimposed on a target object at correct positions without time delay. In FIG. 12D, reference numerals T1, T2 denote encoder signals corresponding to respective light beams that have passed through the opening 19p, and then have been received by the encoder-use light receiving unit 19r, in the first and second rounds of the rotating body 19a respectively. As shown in FIGS. 12D and 12E, lighting pulses (lighting signal) of the display element 11 can be generated in the appropriate timing by using the encoder signal pulses of the supporting body 19f as triggers. This enables the driver UN to visually recognize virtual images as if the virtual images are simultaneously displayed at the virtual image distances L1 to L4 shown in FIG. 9. In addition, as shown in FIG. 12F, if the display element 11 is caused to emit light in the timing corresponding to the virtual image distance L2, it is also possible to make the driver UN visually recognize only the virtual image at the virtual image distance L2.

It should be noted that in the present method, it is preferable to keep the rotational driving of the outer motor 19k constant. The number of rotations of the rotating body 19a can be kept constant by controlling the number of rotations of the outer motor 19k on the basis of rotation angle information of the rotating body 19a. The rotation angle can be detected by using the Hall elements 19m, or the rotary encoder 19o, which have already been described.

(Pattern 2) Method in which the Number of Rotations of the Outer Motor is Controlled With respect to the rotating body 19a, the number of rotations of the outer motor 19k is controlled on the basis of the light emission timing of the display element 11 and the rotation angle information of the rotating body 19a. In a case where the light emission timing of the display element 11 is constant, the method can be effectively used. As shown in FIG. 11, the rotation angle of the rotating body 19a can be detected by using the Hall elements 19m. In addition, as shown in FIG. 14A, the rotation angle may be detected by using the rotary encoder 19o as an alternative to the Hall elements 19m.

Figure 13C:
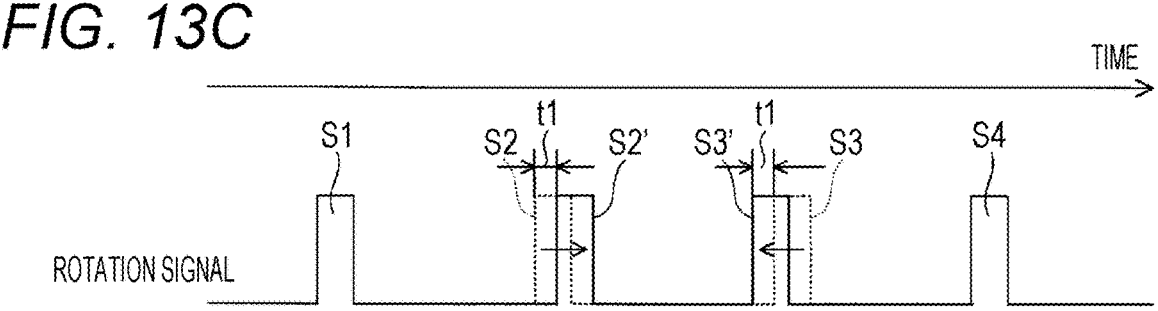
FIGS. 13C and 13D are diagrams illustrating a synchronization method by a pattern 2.
Figure 13D:
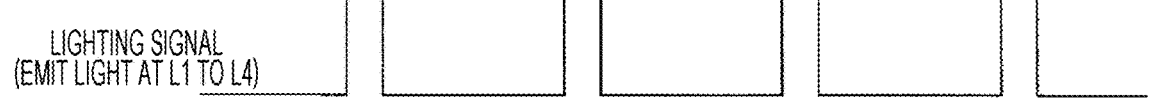

In the present method, as presented in FIGS. 13C and 13D, the number of rotations or rotational speed of the rotating body 19a is delayed by the time difference t1. In a case where the rotation signal pulse corresponding to the virtual image distance L2 is generated in the timing indicated by the reference numeral S2', the rotation signal pulse corresponding to the virtual image distance L3 is output in the timing indicated by the reference numeral S3', in other words, the rotation signal pulse is advanced by the time difference that is the same as the time difference by which the rotation signal pulse corresponding to the virtual image distance L2 is delayed (that is to say, the time difference t1). Subsequently, the rotational speed of the rotating body 19a is adjusted so as to return to the set value in the timing corresponding to the virtual image distance L3. As the result, even if the light emission timing of the display element 11 deviates in the timing corresponding to the virtual image distance L2, the light emission timing of the display element 11 can be synchronized with the original rotational speed of the rotating body 19a in the timing corresponding to the virtual image distance L3. It should be noted that the timing in which the rotational speed is adjusted is not limited to the timing corresponding to the virtual image distance L3. The timing in which the rotational speed is adjusted may be the timing corresponding to the virtual image distance L4 or later. However, in order to prevent a deviation in rotational speed of the rotating body 19a from increasing, it is preferable to perform feedback in a stage in which the deviation in speed is a predetermined threshold value or less. This makes it possible to prevent a deviation in speed from exceeding an allowable value.

In order to synchronize the rotation of the rotating body 19a including the diffusing screen 116 with the light emission timing (the projection display timing) of the display element 11, which becomes projection information, the image display device 100 according to the present embodiment performs feedback control of the rotational speed of the outer motor 19k in such a manner that the rotational speed of the outer motor 19k is continuously kept at the set value. The rotational speed of the outer motor 19k is stable, but may change with the lapse of time. Therefore, if synchronization between the rotation and the light emission timing is not achieved, once the rotational speed of the outer motor 19k has changed, the rotation of the rotating body 19a remains deviated from the light emission timing of the display element 11. This results in inappropriate virtual image distances, or continuous projection at different projection positions. Therefore, in a case where the rotational speed of the outer motor 19k has changed, it is necessary to change the light emission timing of the display element 11 so as to correspond to the change in rotational speed (pattern 1) as described above, or it is necessary to return the rotational speed of the outer motor 19k to the set value (pattern 2). Consequently, virtual images can be displayed at correct virtual image distances and at correct positions for the driver UN.

Third Embodiment

An image display device and the like according to a third embodiment will be described below. It should be noted that the image display device and the like according to the third embodiment is a modification of the image display device and the like according to the first and second embodiments, and therefore matters that are not particularly described are similar to those in the first embodiment or the like.

Figure 15:
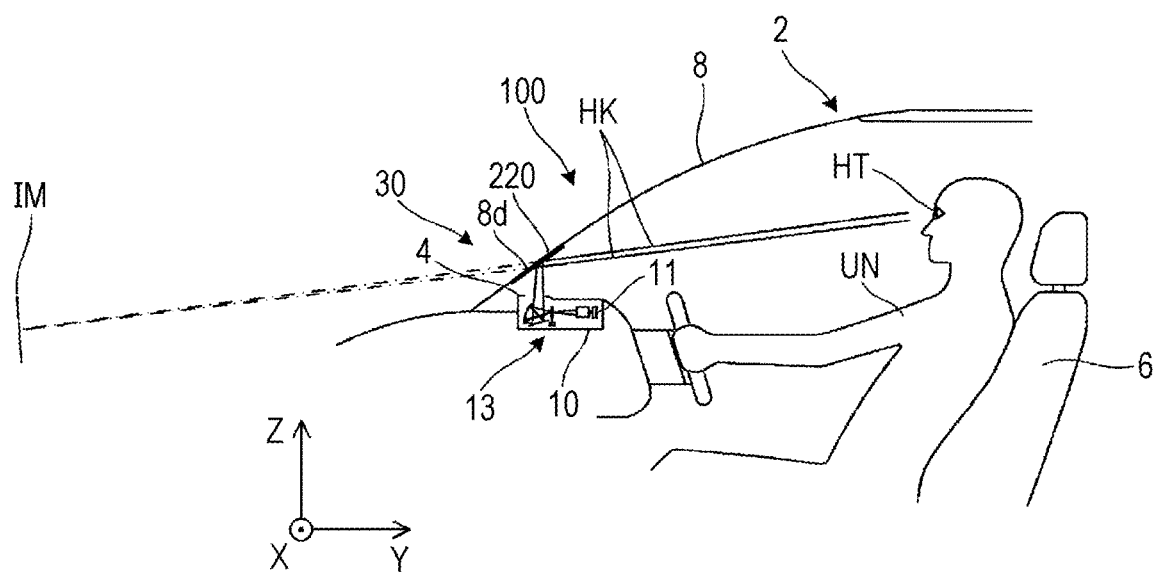
FIG. 15 is a drawing illustrating a virtual image display optical system according to a third embodiment.

As shown in FIG. 15, in the case of the image display device 100 according to the third embodiment, a display screen 220 as a screen is stuck on the inside of a rectangular reflection region 8d that is provided on a front window 8 at a position in front of the driver's seat 6.

Fourth Embodiment

An image display device or a virtual image display optical system according to a fourth embodiment will be described below. It should be noted that the image display device and the like according to the fourth embodiment is a modification of the image display device and the like according to the second embodiment, and therefore matters that are not particularly described are similar to those in the second embodiment.

Figure 16A:
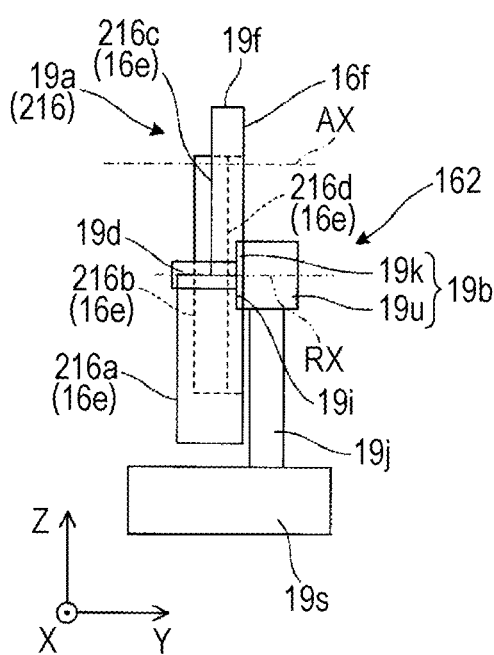
FIGS. 16A and 16B are drawings illustrating, for example, a diffusing screen that is built into a virtual image display optical system according to a fourth embodiment.
Figure 16B:
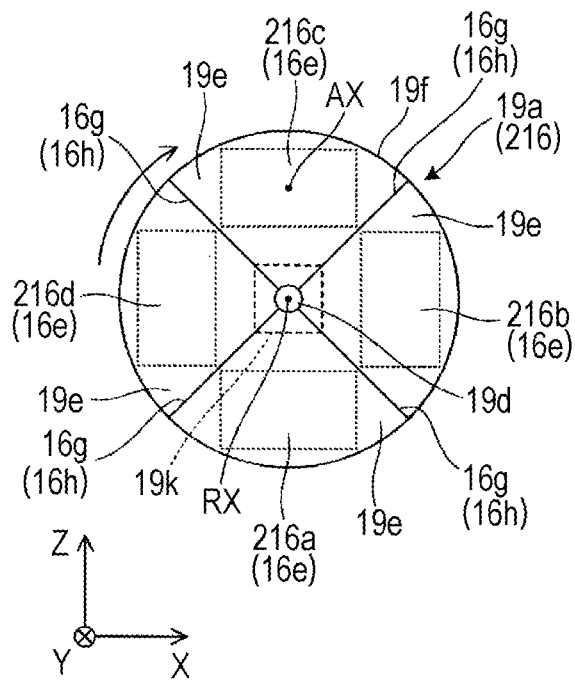

As shown in FIGS. 16A and 16B, in the image display device 100 according to the fourth embodiment, a diffusing screen 216 has a disk shape as a whole, in which a diffusing surface 16e and a bottom surface 16f form a pair of surfaces (or upper and lower surfaces). Viewing from the direction of the optical axis AX, the diffusing screen 216 is divided into a plurality of regions (in the example shown in the figure, four regions), and becomes the rotating body 19a, division boundaries 16g of the rotating body 19a having step parts 16h in the direction of the optical axis AX (or in the up-and-down direction) respectively. The image display device 100 rotates the rotating body 19a to move the diffusing surface 16e of the rotating body 19a so as to cross the optical axis AX, which causes the virtual image distance to change. Specifically, the diffusing screen 16 is constituted of four diffusion regions 216a to 216d as the diffusing surfaces 16e, and a height (or a thickness in the direction of the optical axis AX) of each step part 16h is changed in such a manner that the respective diffusing surfaces 16e of the diffusion regions 216a to 216d differ in position in the direction of the optical axis AX. The central part of the rotating body 19a is provided with a cylindrical concave recess 19i, and the outer motor 19k is provided in the recess 19i.

Although illustration is omitted, the diffusing screen 216 according to the present embodiment uses, for example, a rotary encoder to synchronize the rotational speed of the rotating body 19a with the light emission timing of the display element 11. In this case, the rotary encoder is provided in the central part of the rotating body 19a.

It should be noted that although the rotating body 19a according to the present embodiment is provided with the plurality of step parts 16h so as to change the thickness in the direction of the optical axis AX stepwise, the thickness may be continuously changed in the circumferential direction with the bottom surface 16f used as a reference surface without providing the step parts 16h.

The virtual image display optical system 30 and the image display device 100 have been described above as the specific embodiments. However, the virtual image display optical system and the like according to the present invention are not limited to the ones described above. For example, in the first embodiment, the display screen 20 can also be arranged in the upper part of the front window 8 or at a sun visor position with the arrangement of the image display device 100 vertically reversed. In this case, the display screen 20 is arranged obliquely downward in front of the drawing unit 10. In addition, the display screen 20 may be arranged at a position corresponding to a conventional mirror of an automobile.

In the embodiments described above, the outline of the display screen 20 is not limited to a rectangle. The display screen 20 may have various shapes.

The projection optical system 15 and the virtual image forming optical system 17 shown in FIG. 2 are merely illustrated as an example. The optical configurations of the projection optical system 15 and the virtual image forming optical system 17 can be changed as appropriate. For example, an intermediate image as a preceding stage of the intermediate image TI can be additionally formed in the projection optical system 15. In addition, a mirror that does not have optical power may be arranged in the optical path of the projection optical system 15 or in the optical path of the virtual image forming optical system 17. In this case, there is also a possibility that folding has the advantage of miniaturizing the drawing unit 10 or the like.

In the embodiments described above, the display screen 20 has a flat plate shape. However, considering optical specifications of the main body optical system 13, the display screen 20 may be configured to have a curved surface.

The number of display positions of the display image (virtual image) IM is not limited to three or four as presented in the above-described embodiments, but can be set at an appropriate number that is five or more. In addition, the display image IM can be continually or intermittently displayed while a position is changed.

Figure 17:
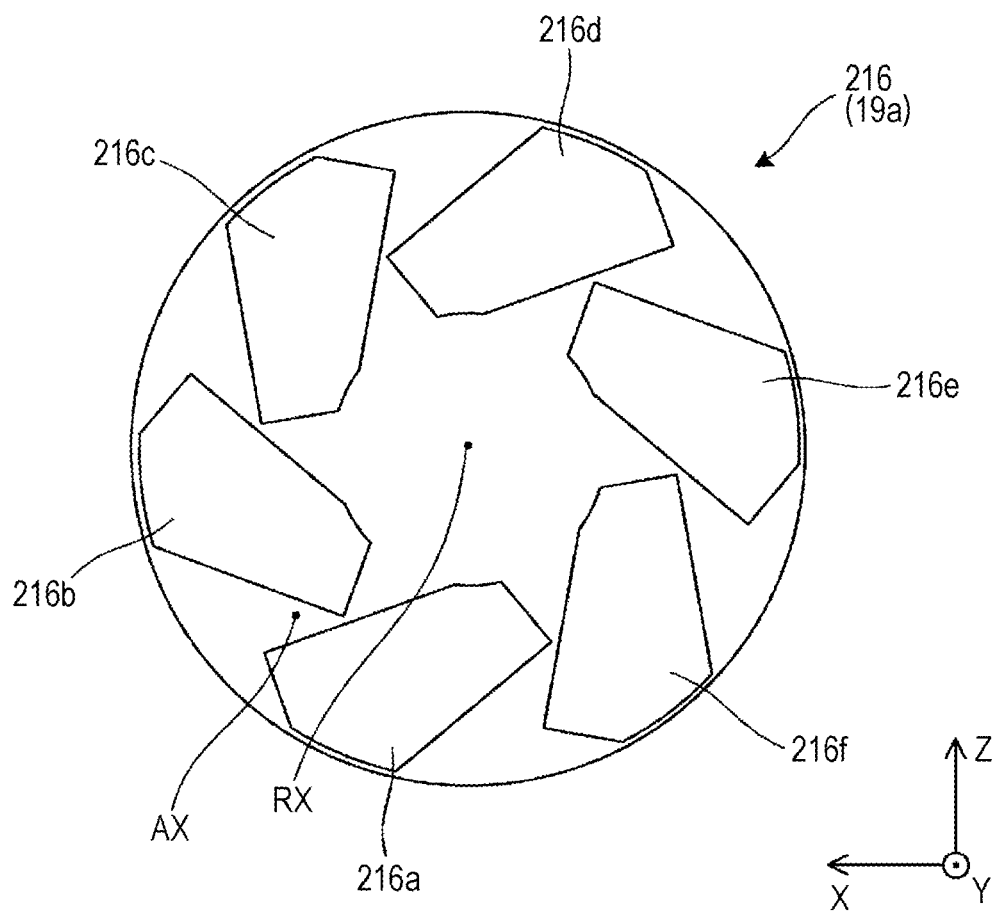
FIG. 17 is a drawing illustrating a diffusing screen in a virtual image display optical system as a modified example.

In the embodiments described above, the diffusion regions 16a to 16d of the diffusing screen 16 are presented as rectangles. However, the diffusion regions of the diffusing screen 16 may each have a trapezoidal shape, a fan shape, or any other shape. As a more preferable embodiment, the shape should be configured in consideration of the number of regions of the diffusing screen, the relationship between the rotation axis RX and the optical axis AX, the rotational speed and the like. For example, FIG. 17 shows a shape that is suitable when considering the rotational speed on the assumption that the diffusing screen 16 is provided with six diffusion regions (diffusion regions 216a to 216f shown in the figure), and the rotation axis RX is arranged at a position that is shifted, for example, in a direction of 45° obliquely upward to right or obliquely downward to left with respect to the optical axis AX. It should be noted that the arrangement related to the direction of the optical axis AX of the diffusion regions 16a to 16d is not limited to the arrangement in which increases or decreases are made stepwise along the direction of the optical axis AX. The far and near order with respect to the virtual image forming optical system 17 can be non-uniformly or irregularly replaced.

In the second embodiment, the feedback control is performed by using the PID control unit 81 so as to synchronize the operation of the diffusing screen 216 with the operation of the display element 11. However, the feedback control may be performed in the first embodiment or the like as well.

Figure 18A:
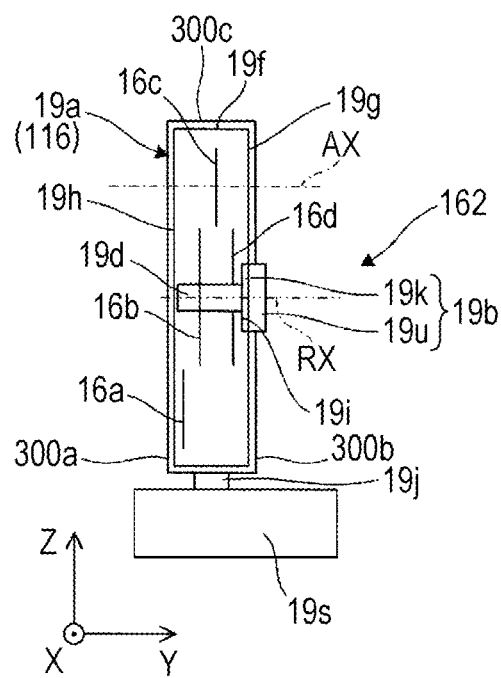

In the embodiments described above, the diffusing screens 16, 116, 216 may be surrounded by a cover 300 that is substantially cylindrical and hollow, and that has optical transparency. As shown in FIG. 18A, in a case where the cover 300 is mounted to the diffusing screen 116 in the second embodiment, the cover 300 is fixed to the support member 19*j*. Incidentally, FIG. 18A shows an example in which the outer motor 19*k* is provided on the supporting body 19*f*, and only the rotating body 19*a* rotates. Although details will be described later, the outer motor 19*k* may be provided in such a manner that not only the supporting body 19*f* but also the cover 300 rotates together with the rotating body 19*a*.

In a case where the diffusing screen 116 or the like has a step or the like viewing from the circumferential direction, rotating the diffusing screen 116 or the like at high speed produces high-frequency wind noises. By covering the diffusing screen 116, etc. like this with the cover 300, noises caused by the rotation of the diffusing screen 116 or the like can be reduced without blocking the optical path. Optically transparent acryl or polycarbonate can be used for the cover 300. In addition, both end surfaces 300*a*, 300*b* of the cover 300 have only to have optical transparency, and plastic that does not have optical transparency can be used for a side surface 300*c*. It should be noted that the cover 300 and the support member 19*j* may be unified so as to rotate the cover 300 and the diffusing screen 116 together. Since it is necessary to ensure optical paths for the projection optical system 15 and the virtual image forming optical system 17, the cover 300 is provided with openings on both sides viewing from the front, and transparent plastic is fitted in each of the openings (not illustrated). The cover 300 may be single or double. In addition, a vibration and sound absorbing member may be provided inside the cover 300.

Figure 18B:
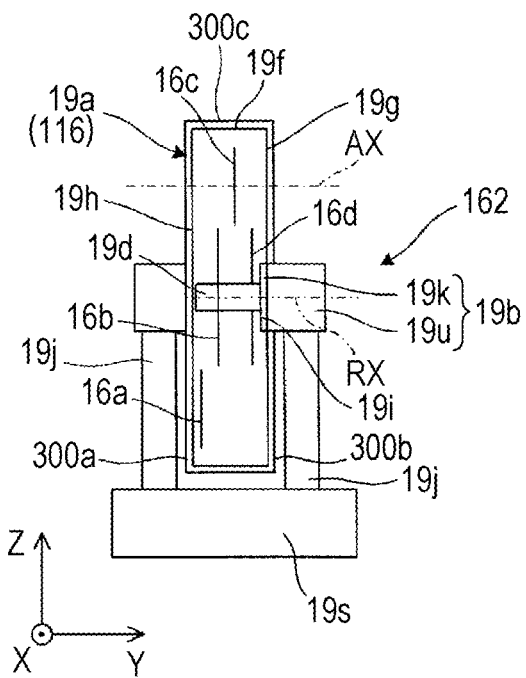

Incidentally, a weight configuration of the rotating body 19*a* that is arranged inside the cover 300 is asymmetric with respect to the rotation axis RX so as to make the virtual image distance variable. While the rotating body 19*a* is approaching the set number of rotations from a stopped state, or at the time of the set rotation, there is a possibility that the rotating body 19*a* will vibrate in the direction of the optical axis AX. In addition, vibrations of the automobile that is being driven may cause vibrations in the direction of the optical axis AX. When such vibrations cause each diffusing screen 116 to be out of the focal depth of the projection optical system 15, a display image becomes out of focus. In order to prevent each diffusing screen 116 from moving in the direction of the optical axis AX, as shown in FIG. 18B, rigid support members 19*j* are provided at both ends of the cover 300 so as to put the rotation axis RX of the outer motor 19*k* therebetween, and the pair of support members 19*j* may be fixed to the support part main body 19*s*.

Fixing the cover 300 by the pair of support members 19*j* enables to enhance the rigidity of the rotating body 19*a* in the direction of the optical axis AX, and thereby to prevent a positional deviation of the diffusing screen 116 itself in the optical axis AX caused by vibrations or the like. In addition, fixing by the support members 19*j* also produces an effect of suppressing a load to a motor bearing, the load being caused by a deviation in the center of gravity of the rotating body 19*a* from the rotation axis RX of the outer motor 19*k*.

Incidentally, with respect to the image display device described in each of the above-described embodiments, four patterns 1 to 4 shown in the following table 1 can be considered, the four patters relating to the operation of the diffusing screen 116 or the like, presence/absence (single or double) of the cover 300, presence/absence of rotation of the cover 300, and a fixing method of the diffusing screen 116 and the cover 300.

TABLE 1

| | Diffusing screen | | Cover | | |
|---|---|---|---|---|---|
| | Presence/Absence | Rotate or Fix | Presence/Absence | Rotate or Fix | Fixing method |
| Pattern 1 | Presence | Rotate | Presence (single) | Rotate | Fix one side from motor side |
| Pattern 2 | Presence | Rotate | Presence (single) | Fix | Fix both sides or Fix one side |
| Pattern 3 | Presence | Rotate | Presence (double) | Rotate inside/Fix outside | Fix both sides or Fix one side |
| Pattern 4 | Presence | Rotate | Presence (double) | Fix inside/Fix outside | Fix both sides or Fix one side |

In the second embodiment or the like, the outer motor 19*k* is used as a mechanism for rotating the rotating body 19*a*. However, other motors may be used.

The invention claimed is:

1. A virtual image display optical system comprising:
   a display element that sequentially forms a plurality of images, each of the plurality of images being different from each other;
   a projection optical system that receives and enlarges the plurality of images formed on the display element;
   a diffusing screen that has a diffusing function, and is positioned on a light emission side of the projection optical system; and
   a virtual image forming optical system that converts a plurality of images on the diffusing screen into a plurality of virtual images, wherein
   the virtual image display optical system further comprises a positioning changing device that moves the diffusing screen in an optical axis direction to sequentially arrange the diffusing screen at a plurality of positions in the optical axis direction, each of the plurality of images corresponding to a respective one of the plurality positions.

2. The virtual image display optical system according to claim 1, wherein the display element has a two-dimensional display surface.

3. The virtual image display optical system according to claim 1, wherein the diffusing screen is positioned at an imaging position of the projection optical system, and causes a virtual image distance to change by being driven so as to reciprocate in the optical axis direction within a focal depth.

4. The virtual image display optical system according to claim 1, wherein the diffusing screen is a rotating body having a plurality of regions that differ in position related to the optical axis direction, and that can be positioned at imaging positions of the projection optical system, and a virtual image distance is changed by rotating the rotating body to move the plurality of regions so as to cross an optical axis.

5. The virtual image display optical system according to claim 1, wherein the diffusing screen is a rotating body having a disk shape, in which a diffusing surface and a bottom surface form a pair of surfaces, and in which a thickness in the optical axis direction differs in a circumferential direction, and a virtual image distance is changed by rotating the rotating body to move the diffusing surface of the rotating body so as to cross the optical axis.

6. The virtual image display optical system according to claim 4, wherein the rotating body is controlled to forwardly rotate by an outer motor.

7. The virtual image display optical system according to claim 4, wherein the display element is controlled by using rotation pulses of the rotating body as triggers.

8. The virtual image display optical system according to claim 4, wherein the diffusing screen is surrounded by a cover that is substantially cylindrical and hollow, and that has optical transparency.

9. The virtual image display optical system according to claim 1, wherein the diffusing screen moves in synchronization with display operation of the display element.

10. The virtual image display optical system according to claim 9, wherein the display element operates at a frame rate of 30 fps or more.

11. The virtual image display optical system according to claim 1, wherein the projection optical system has a diaphragm, and the diaphragm is arranged most on the diffusing screen side of the projection optical system.

12. An image display device that is equipped with the virtual image display optical system according to claim 1.

13. The virtual image display optical system according to claim 2, wherein the diffusing screen is positioned at an imaging position of the projection optical system, and causes a virtual image distance to change by being driven so as to reciprocate in the optical axis direction within a focal depth.

14. The virtual image display optical system according to claim 2, wherein the diffusing screen is a rotating body having a plurality of regions that differ in position related to the optical axis direction, and that can be positioned at imaging positions of the projection optical system, and a virtual image distance is changed by rotating the rotating body to move the plurality of regions so as to cross an optical axis.

15. The virtual image display optical system according to claim 2, wherein the diffusing screen is a rotating body having a disk shape, in which a diffusing surface and a bottom surface form a pair of surfaces, and in which a thickness in the optical axis direction differs in a circumferential direction, and a virtual image distance is changed by rotating the rotating body to move the diffusing surface of the rotating body so as to cross the optical axis.

16. The virtual image display optical system according to claim 2, wherein the diffusing screen moves in synchronization with display operation of the display element.

17. A virtual image display optical system comprising:

a display element;

a projection optical system that enlarges an image formed on the display element;

a diffusing screen that has a diffusing function, and is positioned on a light emission side of the projection optical system; and a virtual image forming optical system that converts an image on the diffusing screen into a virtual image, wherein the virtual image display optical system further comprises a positioning changing device that changes a position of the diffusing screen, the diffusing screen is a rotating body having a plurality of regions that differ in position related to an optical axis direction, and that can be positioned at imaging positions of the projection optical system, a virtual image distance is changed by rotating the rotating body to move the plurality of regions so as to cross an optical axis, and a number of rotations of the rotating body is controlled on the basis of rotation angle information of the rotating body.

18. A virtual image display optical system comprising:

a display element;

a projection optical system that enlarges an image formed on the display element;

a diffusing screen that has a diffusing function, and is positioned on a light emission side of the projection optical system; and a virtual image forming optical system that converts an image on the diffusing screen into a virtual image, wherein the virtual image display optical system further comprises a positioning changing device that changes a position of the diffusing screen, and the virtual image display optical system satisfies the following conditional expression:

$$2 \leq FOV/(m \times H) \leq 4$$

where:

FOV is a viewing angle [rad] of the virtual image forming optical system;

m is an optical magnification of the projection optical system; and

H is a horizontal directional length [m] of the display element.

19. A virtual image display optical system comprising:

a display element;

a projection optical system that enlarges an image formed on the display element;

a diffusing screen that has a diffusing function, and is positioned on a light emission side of the projection optical system; and a virtual image forming optical system that converts an image on the diffusing screen into a virtual image, wherein the virtual image display optical system further comprises a positioning changing device that changes a position of the diffusing screen, and the virtual image forming optical system satisfies the following conditional expression:

$$2 \leq M/L \leq 4$$

where:

M is an optical magnification of the virtual image forming optical system; and

L is a distance [m] from an observation position to a virtual image.

20. A virtual image display optical system comprising:

a display element;

a projection optical system that enlarges an image formed on the display element;

a diffusing screen that has a diffusing function, and is positioned on a light emission side of the projection optical system; and a virtual image forming optical system that converts an image on the diffusing screen into a virtual image, wherein the virtual image display optical system further comprises a positioning changing device that changes a position of the diffusing screen, and an F-number of the projection optical system is set so as to satisfy the following conditional expression:

$$0.8 \leq 2 \times F \times P \times m^2 / \delta \leq 1.2$$

where:

F is an F-number on the display element side of the projection optical system;

P is a pixel pitch [mm] of the display element; and

δ is a diffusing screen moving distance [mm] required to obtain a desired virtual image distance range.

* * * * *